United States Patent
Ko et al.

(10) Patent No.: US 11,960,278 B2
(45) Date of Patent: Apr. 16, 2024

(54) MOVING ROBOT AND CONTROLLING METHOD THEREOF

(71) Applicant: LG ELECTRONICS INC., Seoul (KR)

(72) Inventors: Kyoungsuk Ko, Seoul (KR); Sungwook Lee, Seoul (KR); Hyungsub Lee, Seoul (KR); Koh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 17/265,761

(22) PCT Filed: Jul. 16, 2019

(86) PCT No.: PCT/KR2019/008802
§ 371 (c)(1),
(2) Date: Feb. 3, 2021

(87) PCT Pub. No.: WO2020/032413
PCT Pub. Date: Feb. 13, 2020

(65) Prior Publication Data
US 2021/0271238 A1 Sep. 2, 2021

Related U.S. Application Data

(60) Provisional application No. 62/714,746, filed on Aug. 5, 2018.

(30) Foreign Application Priority Data

Apr. 29, 2019 (KR) .................. 10-2019-0050058

(51) Int. Cl.
*G05D 1/00* (2006.01)
*B60L 53/36* (2019.01)
(Continued)

(52) U.S. Cl.
CPC ............ *G05D 1/0022* (2013.01); *B60L 53/36* (2019.02); *B60L 53/66* (2019.02); *G05D 1/0016* (2013.01);
(Continued)

(58) Field of Classification Search
None
See application file for complete search history.

(56) References Cited

U.S. PATENT DOCUMENTS 6,764,373 B1 7/2004 Osawa et al.
8,433,468 B2 4/2013 Johnson et al.
(Continued)

FOREIGN PATENT DOCUMENTS

CN 106171248 A 12/2016
DE 102015218225 A1 4/2016
(Continued)

OTHER PUBLICATIONS

Office Action, dated Nov. 16, 2020, issued in Korean Patent Application No. 10-2019-0050058 (5 pages).
(Continued)

*Primary Examiner* — Wilson Lee
(74) *Attorney, Agent, or Firm* — Birch, Stewart, Kolasch & Birch, LLP

(57) ABSTRACT

A moving robot and a controlling method thereof are disclosed. A moving robot according to the present disclosure includes a traveling unit to move a main body, a communication unit to communicate with a location information transmitter for transmitting signals within an area, and a control unit to set a virtual boundary with respect to a location calculated based the signals, and to control the traveling unit to move the main body without departing from the boundary. The communication unit includes first and antennas provided at respective transceivers that transceive (Continued)

signals with the location information transmitter, and the first and second antennas have an adjustable distance. When signals are received through the first and second antennas, the control unit determines a relative location of the location information transmitter based on a current location of the main body using a frequency corresponding to the distance between the first and second antennas.

12 Claims, 20 Drawing Sheets

(51) Int. Cl.
 *B60L 53/66* (2019.01)
 *H01Q 1/27* (2006.01)
 *H01Q 3/22* (2006.01)
 *A01D 34/00* (2006.01)
 *A01D 101/00* (2006.01)
 *G01S 5/02* (2010.01)

(52) U.S. Cl.
 CPC ......... *G05D 1/0088* (2013.01); *G05D 1/0214* (2013.01); *G05D 1/0219* (2013.01); *G05D 1/0225* (2013.01); *G05D 1/028* (2013.01); *G05D 1/0295* (2013.01); *H01Q 1/27* (2013.01); *H01Q 3/22* (2013.01); *A01D 34/008* (2013.01); *A01D 2101/00* (2013.01); *B60L 2260/32* (2013.01); *G01S 5/0284* (2013.01); *G05D 2201/0208* (2013.01)

(56) References Cited

U.S. PATENT DOCUMENTS

| | | | |
|---|---|---|---|
| 8,942,862 | B2 | 1/2015 | Markusson et al. |
| 8,996,171 | B2 | 3/2015 | Anderson et al. |
| 9,471,063 | B2 | 10/2016 | Ouyang |
| 9,788,153 | B1 | 10/2017 | Newstadt et al. |
| 10,383,497 | B2 | 8/2019 | Han et al. |
| 10,815,005 | B1* | 10/2020 | Wilcox ............... H01Q 15/14 |
| 2006/0238159 | A1 | 10/2006 | Jung |
| 2007/0109177 | A1* | 5/2007 | Baath ................ G01S 13/88 342/25 C |
| 2008/0224874 | A1* | 9/2008 | Rodgers ............. H01Q 1/2208 340/572.7 |
| 2009/0043462 | A1 | 2/2009 | Stratton et al. |
| 2010/0168934 | A1 | 7/2010 | Ball et al. |
| 2011/0237274 | A1 | 9/2011 | Wong et al. |
| 2012/0038520 | A1* | 2/2012 | Cornwell ............ H01Q 9/0428 343/702 |
| 2012/0293371 | A1 | 11/2012 | Lu |
| 2013/0025248 | A1 | 1/2013 | Kraft et al. |
| 2013/0041526 | A1 | 2/2013 | Ouyang |
| 2013/0218397 | A1 | 8/2013 | Griffini et al. |
| 2014/0196967 | A1 | 7/2014 | Chang et al. |
| 2015/0328775 | A1 | 11/2015 | Shamlian et al. |
| 2015/0366129 | A1 | 12/2015 | Borinato |
| 2016/0026185 | A1 | 1/2016 | Smith et al. |
| 2016/0059875 | A1* | 3/2016 | Segman ............... B62B 5/0079 701/24 |
| 2016/0174459 | A1 | 6/2016 | Balutis et al. |
| 2016/0363933 | A1 | 12/2016 | Balutis et al. |
| 2016/0366818 | A1 | 12/2016 | Ouyang |
| 2016/0377688 | A1 | 12/2016 | Kleiner et al. |
| 2016/0379164 | A1 | 12/2016 | Li |
| 2017/0026818 | A1 | 1/2017 | Beaulieu et al. |
| 2017/0039860 | A1 | 2/2017 | Just |
| 2017/0050059 | A9 | 2/2017 | Cardano et al. |
| 2017/0108860 | A1 | 4/2017 | Doane et al. |
| 2017/0127608 | A1 | 5/2017 | Biber et al. |
| 2017/0150676 | A1 | 6/2017 | Yamauchi et al. |
| 2018/0081366 | A1 | 3/2018 | Tan et al. |
| 2018/0173223 | A1 | 6/2018 | Doane et al. |
| 2018/0191063 | A1* | 7/2018 | Sonoda ................ H01Q 9/0457 |
| 2018/0267136 | A1 | 9/2018 | Zhong et al. |
| 2019/0025847 | A1 | 1/2019 | Mannefred et al. |
| 2019/0208979 | A1 | 7/2019 | Bassa et al. |
| 2019/0212730 | A1 | 7/2019 | Jones et al. |
| 2019/0337155 | A1 | 11/2019 | Kwak et al. |
| 2020/0037498 | A1 | 2/2020 | Ko et al. |
| 2020/0037499 | A1 | 2/2020 | Ko et al. |
| 2020/0041601 | A1 | 2/2020 | Ko et al. |
| 2021/0037703 | A1 | 2/2021 | Holgersson |

FOREIGN PATENT DOCUMENTS

| | | |
|---|---|---|
| EP | 3200040 A1 | 8/2017 |
| EP | 3 309 641 A1 | 4/2018 |
| FR | 3043304 A1 | 5/2017 |
| JP | 2006-236132 A | 9/2006 |
| JP | 2017-531423 | 10/2017 |
| JP | 2017-531423 A | 10/2017 |
| KR | 10-2001-0009583 A | 2/2001 |
| KR | 2001-0009583 | 2/2001 |
| KR | 10-2004-0081629 A | 9/2004 |
| KR | 10-2006-0111780 | 10/2006 |
| KR | 10-2006-0111780 A | 10/2006 |
| KR | 10-2007-0012119 A | 1/2007 |
| KR | 10-2007-0061218 A | 6/2007 |
| KR | 10-2007-0109748 A | 11/2007 |
| KR | 10-2008-0001003 | 1/2008 |
| KR | 10-2009-0011418 A | 2/2009 |
| KR | 10-2009-0076721 A | 7/2009 |
| KR | 10-2013-0014105 | 2/2013 |
| KR | 10-2013-0014105 A | 2/2013 |
| KR | 10-2014-0066850 | 6/2014 |
| KR | 10-2014-0073657 A | 6/2014 |
| KR | 10-2015-0125508 A | 11/2015 |
| KR | 10-2016-0026293 | 3/2016 |
| KR | 10-2016-0026293 A | 3/2016 |
| KR | 10-2016-0063140 A | 6/2016 |
| KR | 10-2016-0128124 A | 11/2016 |
| KR | 10-2016-0133348 | 11/2016 |
| KR | 10-2016-0133348 A | 11/2016 |
| KR | 10-2016-0136131 A | 11/2016 |
| KR | 10-2016-0149562 | 12/2016 |
| KR | 10-2016-0149562 A | 12/2016 |
| KR | 10-2017-0073162 A | 6/2017 |
| KR | 10-1742913 | 6/2017 |
| KR | 10-2017-0082006 | 7/2017 |
| KR | 10-2017-0082006 A | 7/2017 |
| KR | 10-2017-0082016 | 7/2017 |
| KR | 10-2018-0038879 | 4/2018 |
| KR | 10-2018-0038879 A | 4/2018 |
| KR | 10-2018-0069237 A | 6/2018 |
| KR | 10-2018-0085309 | 7/2018 |
| WO | WO 03/104909 A1 | 12/2003 |
| WO | WO 2015/192902 A1 | 12/2015 |
| WO | WO 2016/097900 A1 | 6/2016 |
| WO | WO 2016/160376 A1 | 10/2016 |
| WO | WO 2017015554 A1 | 1/2017 |
| WO | WO 2018/108179 A1 | 6/2018 |

OTHER PUBLICATIONS

PCT International Search Report, dated Nov. 19, 2019, issued in International Patent Application No. PCT/KR2019/009702 (1 page).
PCT International Search Report, dated Nov. 19, 2019, issued in International Patent Application No. PCT/KR2019/008801 (1 page).
U.S. Appl. No. 17/266,481, filed Feb. 5, 2021, Kyoungsuk Ko et al.
U.S. Appl. No. 17/266,457, filed Feb. 5, 2021, Kyoungsuk Ko et al.
U.S. Appl. No. 16/526,314, filed Jul. 30, 2019, Kyoungsuk Ko et al.
U.S. Appl. No. 16/526,260, filed Jul. 30, 2019, Kyoungsuk Ko et al.
U.S. Appl. No. 16/531,222, filed Aug. 5, 2019, Kyoungsuk Ko et al.
European Extended Search Report, dated Apr. 24, 2020, issued in European Patent Application No. EP19189646.3 (10 pages).
Leonard et al.; "Mobile Robot Localization by Tracking Geometric Beacons"; *IEEE Transactions on Robotics and Automation*, vol. 7, No. 3; Jun. 1991 (7 pages).

(56) References Cited

OTHER PUBLICATIONS

Li et al.; "An Approach to Improve the Positioning Performance of GPS/INS/UWB Integrated System with Two-Step Filter"; *Remote Sensing*, 2018 (14 pages).
Notice of Allowance, dated Jan. 13, 2021, issued in Korean Patent Application No. KR10-2019-0083393 (5 pages).
Office Action, dated Oct. 8, 2020, issued in Australian Patent Application No. AU2019210641 (7 pages).
Office Action, dated Sep. 7, 2020, issued in Korean Patent Application No. KR10-2019-0083393 (4 pages).
Office Action, dated Jul. 30, 2020, issued in Korean Patent Application No. KR10-2019-0068832 (5 pages).
Office Action, dated Jul. 25, 2020, issued in Korean Patent Application No. KR10-2019-0012994 (19 pages).
Office Action, dated Jul. 9, 2020, issued in Korean Patent Application No. KR10-2019-0012990 (14 pages).
Office Action, dated Jul. 9, 2020, issued in Korean Patent Application No. KR10-2019-0012989 (17 pages).
Office Action, dated May 6, 2020, issued in Australian Patent Application No. AU2019208265 (6 pages).
Notice of Allowance received from the Korean Intellectual Property Office in Korean Application No. 10-2019-0050956, dated Jul. 19, 2021 (2 pages).
Notice of Allowance received from the Korean Intellectual Property Office in Korean Application No. 10-2019-0050959, dated May 27, 2021 (2 pages).
Korean Notice of Allowance received from the Korean Intellectual Property Office in Korean Application No. 10-2019-0012989, dated Jan. 25, 2021 (2 pages).
Korean Notice of Allowance received from the Korean Intellectual Property Office in Korean Application No. 10-2019-0012994, dated Mar. 22, 2021 (3 pages).
Extended European Search Report, dated Jan. 18, 2022, issued in European Patent Application No. 21193991.3 (8 pages).

* cited by examiner

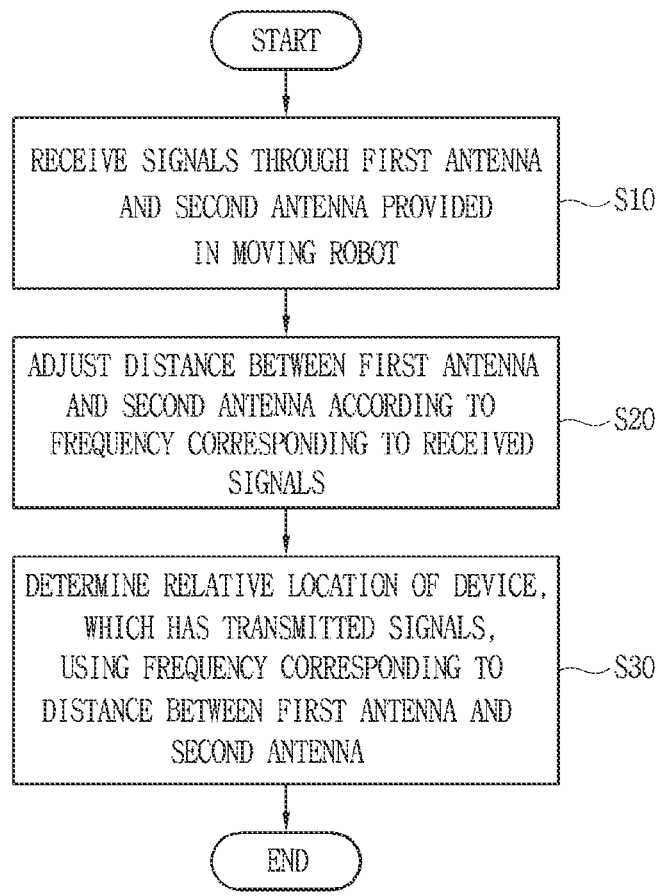

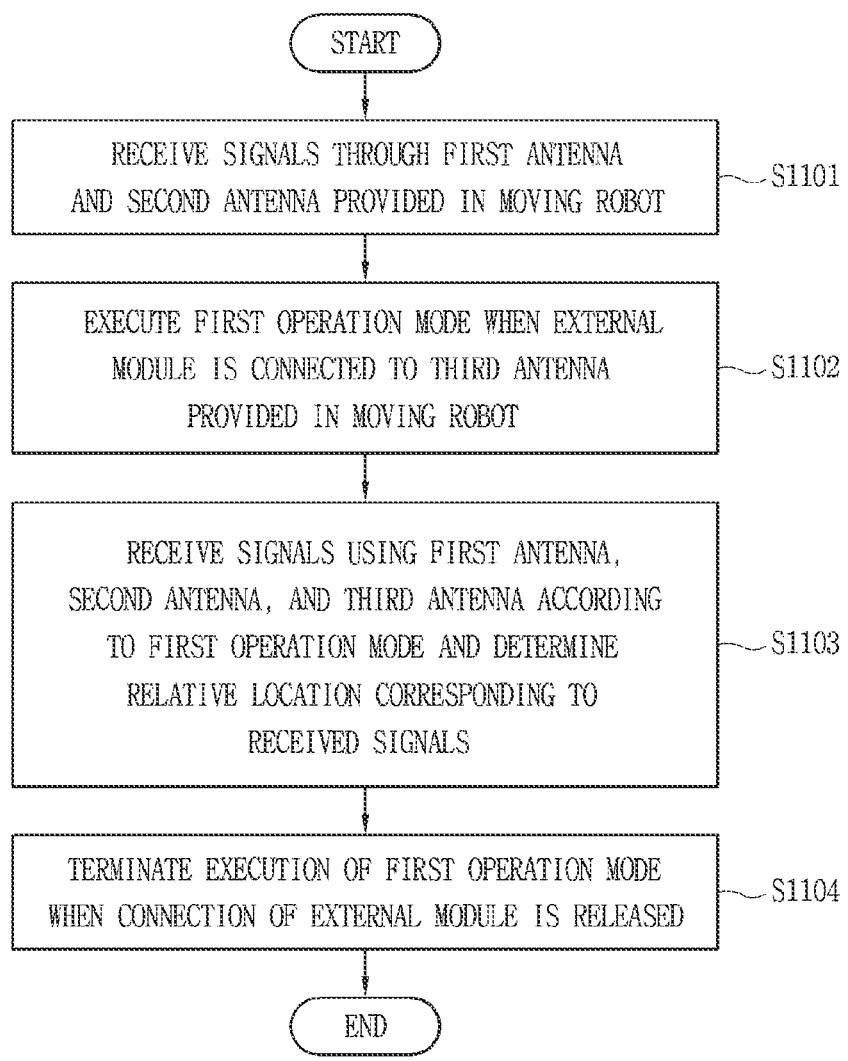

MOVING ROBOT AND CONTROLLING METHOD THEREOF

CROSS-REFERENCE TO RELATED APPLICATIONS

This application is the National Stage filing under 35 U.S.C. 371 of International Application No. PCT/KR2019/008802, filed on Jul. 16, 2019, which claims the benefit of earlier filing date and rights of priority to U.S. Provisional application No. 62/714,746 filed on Aug. 5, 2018 and Korean Application No. 10-2019-0050058 filed on Apr. 29, 2019, the contents of all of which are all hereby incorporated by reference herein in their entirety.

TECHNICAL FIELD

The present disclosure relates to a moving robot that autonomously travels in a designated area, and a method for controlling the same.

BACKGROUND

Generally, a moving robot is a device that automatically performs a predetermined operation while traveling by itself in a predetermined range without a user's operation. The moving robot senses obstacles located in the area and performs its operations by moving close to or away from such obstacles.

Such a moving robot may include a cleaning robot that carries out cleaning while traveling in an area, as well as a lawn mower robot that mows the grass on a bottom of the area.

Generally, a lawn mower includes a passenger type which a user boards and controls to mow the lawn or cut the grass during movement, and a work-behind type or hand-operating type that is pulled or pushed manually by a user to cut the grass. Such lawn mowers are moved by a direct control of the user to mow the lawn, which causes user's inconvenience in that the device is operated only directly by the user Such lawn mowers are moved by a direct control of the user to mow the lawn, which causes user's inconvenience in that the device is operated only directly by the user.

Accordingly, a moving robot type lawn mower that an element for mowing the lawn is provided on a moving robot, namely, a lawn mower robot has been studied. However, since the lawn mower robot operates outdoors other than indoors, it is necessary to set an area to be moved in advance. Specifically, since the outdoors is an open space unlike the indoors, an area designation should first be carried out, and an area to be driven by the robot should be limited to a space where grass is growing.

For this purpose, in Korean Patent Laid-Open Publication No. 2015-0125508, wires are laid under the ground where grass is planted, in order to set an area to be moved by a lawn mower robot or a moving robot, and the moving robot is controlled to move in an inner area of the wires. Then, a boundary for the moving robot is set based on a voltage value induced by the wires.

However, this method has a problem that the wires must be laid under the ground every time of setting the boundary. In addition, in order to change the boundary once set, new wires must be laid after the previously laid wires are removed, which causes much time and efforts for the boundary setting.

In order to solve this problem, a method of restricting the travel of a moving robot which sets a virtual wall by transmitting a signal through Beacon technology. However, since such a virtual wall can be set only linearly, it is not suitable for an outdoor area having various shapes of terrains. In addition, a plurality of ancillary devices for setting up a virtual wall is required, which increases the cost, and there is a limitation in that the virtual wall cannot be set over all areas.

In addition, a method of restricting the travel of a moving robot based on GPS-based positioning is known to have an average error of about 2 to 5 m, which fails to satisfy the minimum positioning error range of about 30 cm required for autonomous travel. Also, even when sensors such as DGPSs, cameras, LiDARs, Radars and the like are used to reduce the average error of the GPS, blind zones and high cost are caused, and thus those sensors are difficult to be commercialized in general.

Meanwhile, beacon-based positioning may be used to overcome the disadvantages of the GPS-based positioning.

The US Patent laid-open Publication No. US 2017/0026818 discloses a method in which a mobile lawn mower robot is paired with a distance between the Beacon and the mobile lawn mower robot is determined, it is determined whether the Beacon is located within a pairing distance by comparing the determined distance with the pairing distance, and the result of the determination is used for a navigator. However, there are drawbacks and security issues in that related applications should be installed to use the Beacon and pairing should be carried out.

Recently, a method of restricting the travel of a moving robot by using a low-cost Ultra-Wideband (UWB) communication technology known to have precision of about 30 cm or shorter has been studied. Ultra-Wideband (UWB) is suitable for real-time location tracking because it is hardly affected by multipath problems by virtue of its properties of precise region estimation and material penetration.

By using such Ultra-Wideband (UWB) communication technology, a relative location of another device, for example, UWB tag, existing in a UWB positioning range may be calculated. In the case of determining the relative location of the UWB tag using the UWB communication technology, Angle of Arrival (AoA) positioning technology may be used.

The AoA positioning is a positioning method of finding a direction of a signal, for example, a UWB signal, coming into a receiver with respect to a signal source by measuring an angle of arrival (AoA) of the received signal, and then determining a location using triangulation. This method increases accuracy with the use of more antennas.

However, in the AoA positioning technology, errors occur when a multipath is caused due to obstacles or the like, and also occur as a distance from a signal source increases. In addition, a positioning error is caused due to installation intervals of antennas and a difference between actual effective operating angles due to physical characteristics of the antennas. Further, even if using a plurality of antennas, relative locations are calculated. Accordingly, it is difficult to determine whether a UWB tag is located at the front or at the rear of a moving robot.

SUMMARY

Technical Problem

One aspect of the present disclosure is to provide a moving robot, capable of more accurately detecting a relative location of an Ultra-Wideband (UWB) tag even when signal disturbance occurs in the case of determining the relative location of the UWB tag using a UWB communication technology, and a method for controlling the same.

Another aspect of the present disclosure is to provide a moving robot, capable of accurately determining a relative location of a UWB tag using only a limited number of antennas even in an environment where a frequency to be used is changed to determine the relative location of the UWB tag, and a method for controlling the same.

Still another aspect of the present disclosure is to provide a moving robot, capable of solving limitation of an actual effective operating angle due to physical characteristics of antennas and determining whether a UWB tag is located at the front or rear of the moving robot, and a method for controlling the same.

Technical Solution

To achieve these aspects and other advantages of the present disclosure according to an embodiment of the present disclosure, there is provided a moving robot including a traveling unit to move a main body thereof, a communication unit to perform communication with a location information transmitter for transmitting signals within an area, and a control unit to set a virtual boundary with respect to a location calculated based the signal of the location information transmitter, and to control the traveling unit so that the main body is moving without departing from the set boundary, wherein the communication unit comprises a first antenna and a second antenna provided in respective transceivers that transmit and receive signals to and from the location information transmitter, and the first antenna and the second antenna have an adjustable distance therebetween. Also, when signals are received through the first antenna and the second antenna, the control unit may determine a relative location of the location information transmitter with respect to a current location of the main body using a frequency corresponding to the distance between the first antenna and the second antenna.

Also, in one embodiment, at least one of the first antenna and the second antenna may include a sliding guide module, and the at least one antenna may move along the sliding guide module according to a control command of the control unit.

In one embodiment, the sliding guide module may include stoppers provided on a plurality of points thereof, respectively, and each of the stoppers may be configured to stop an antenna moving in a lengthwise direction of the sliding guide module. The control unit may control the sliding guide module such that the stopper located at a point selected according to the control command is driven.

In one embodiment, the distance between the first antenna and the second antenna may be automatically determined according to a frequency to be used that matches the received signal.

Further, in one embodiment, the main body may include a plurality of light emitting diodes provided on one side thereof each indicating a distance corresponding to the determined distance, and the control unit may control one light emitting diode, which is disposed on a location corresponding to the determined distance, among the plurality of light emitting diodes, to emit light, and control one of the first antenna and the second antenna to be positioned at a location corresponding to the light-emitted light emitting diode.

In one embodiment, the control unit may determine two intersections between a first area having an effective radius with respect to the first antenna and a second area having an effective radius with respect to the second antenna, based on a plurality of antenna combinations according to adjustment of the distance between the first antenna and the second antenna, and determine an intersection of an area including more similar values, of the determined two intersection points, as the relative location of the location information transmitter.

In one embodiment, the communication unit may further include a third antenna and a fourth antenna. The first antenna and the second antenna may be connected to a first transceiver through the first switch, and the third antenna and the fourth antenna may be connected to a second transceiver through the second switch. The control unit may control operations of the first switch and the second switch to determine areas having effective radii for each of a plurality of antenna combinations.

In one embodiment, the communication unit may further include a third antenna. The first antenna may be connected to a first transceiver through the first switch, the second antenna may be connected to a second transceiver through the second switch, and the third antenna may be connected to the first switch and the second switch through a third switch. The control unit may control operations of the first switch, the second switch, and the third switch so as to increase an effective range of the first area and the second area.

In one embodiment, the communication unit may further include a third antenna and a fourth antenna. The third antenna may be connected to a first transceiver through the first switch, and the fourth antenna may be connected to a second transceiver through the second switch. The first antenna may be connected to the first switch and the second switch through a third switch, and the second antenna may be connected to the first switch and the second switch through a fourth switch. The control unit may control operations of the first to fourth switches to determine areas having effective radii for each of a plurality of antenna combinations.

In one embodiment, the communication unit may further include at least a third antenna.

The main body may include a connector element provided on one side thereof and connected to the third antenna through a cable, and a module having at least one communication chip therein may be mounted to the connector element.

In one embodiment, the control unit may control the third antenna to be activated, in response to detection that the module is mounted.

In one embodiment, the control unit may switch the third antenna from an active state into an inactive state, in response to detection that the mounted module is released.

A method for controlling a moving robot in accordance with an embodiment of the present disclosure may include receiving signals through a first antenna and a second antenna from a location information transmitter that transmits the signals in an area, adjusting a distance between the first antenna and the second antenna according to a frequency corresponding to the received signals, and determining a relative location of the location information transmitter, which has transmitted the signals, using a frequency corresponding to the distance between the first antenna and the second antenna.

In one embodiment, the method may further include detecting connection of an external module to a third antenna provided in a moving robot main body, and executing a first operation mode in response to the detection, receiving signals using the first antenna, the second antenna, and the third antenna, and determining a relative location corresponding to the received signals.

In one embodiment, the method may further include terminating the execution of the first operation mode when the connection of the external module is released, and receiving signals through the first antenna and the second antenna.

Advantageous Effects

As described above, in a moving robot and a method of controlling the same according to the embodiment of the present disclosure, a distance between a plurality of antennas can be determined differently according to a frequency to be used, and a location of an antenna can be changed to satisfy the determined distance, which may result in determining a relative location corresponding to signals received from a UWB tag. Also, in the present disclosure, it is possible to determine whether the UWB tag that has transmitted signals is located at the front or at the rear of the moving robot, simply by using appropriate combination of a plurality of antennas, and to obtain the same effect as an increase in an effective operating angle.

BRIEF DESCRIPTION OF THE DRAWINGS

FIG. 6 is a representative flowchart illustrating a method of controlling a moving robot according to an embodiment of the present disclosure.

FIG. 11 is another flowchart illustrating a method of controlling a moving robot in accordance with an embodiment of the present disclosure.

DETAILED DESCRIPTION

Hereinafter, a moving robot according to the present disclosure will be described in detail with reference to the accompanying drawings.

Hereinafter, description will be given in detail of embodiments disclosed herein. Technical terms used in this specification are merely used for explaining specific embodiments, and should not be construed to limit the scope of the technology disclosed herein.

First, the term "moving robot" disclosed herein may be used as the same meaning as "robot" which can autonomously travel, "lawn mower moving robot," "lawn mower robot," "lawn mower," and "moving robot for mowing lawn," and those terms will be used equally.

Figure 1:
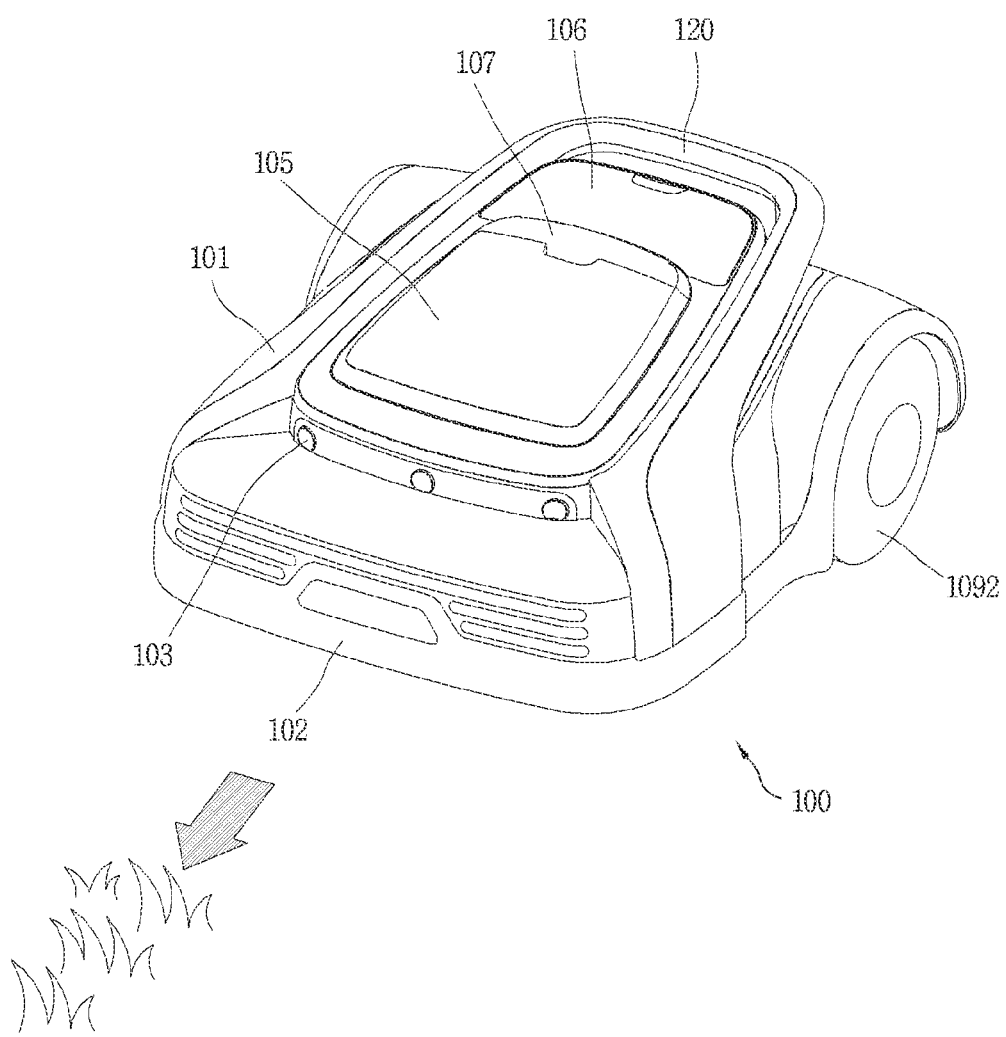
FIG. 1 is a perspective view illustrating an example of a moving robot according to the present disclosure.

FIG. 1 is a block diagram of a moving robot for mowing lawn according to the present disclosure.

A moving robot according to the present disclosure may include an outer cover 101, an inner body (not shown), and wheels 1092.

The outer cover 101 may define appearance of the moving robot. The appearance of the moving robot may be formed in a shape similar to an automobile, for example. The outer cover 101 may be formed to cover an outside of the inner body (not shown).

The outer cover 101 may be mounted on an upper portion of the inner body so as to cover the upper portion of the inner body. A receiving portion may be formed inside the outer cover 101, and the inner body may be received in the receiving portion.

A bumper 102 may be provided on a front portion of the outer cover 101 in preparation for collision with an obstacle. The bumper 102 may be formed of a rubber material that can mitigate impact.

A plurality of ultrasonic sensor modules 103 may be mounted on a front upper portion of the outer cover 101. The plurality of ultrasonic sensor modules 103 is configured to emit ultrasonic waves toward the front of the robot while the robot travels, and receive reflected waves reflected from the obstacle, so as to detect the front obstacle.

The plurality of ultrasonic sensor modules 103 may be spaced apart from one another in a vehicle width direction. The plurality of ultrasonic sensor modules 103 may be spaced apart from the bumper 102 rearward by a designated distance. In addition, the plurality of ultrasonic sensor modules 103 may be replaced with other signal-based sensors, such as UWB sensors, other than the ultrasonic sensors.

The moving robot may include a control unit. The control unit may stop the operation of the moving robot when an obstacle is detected by receiving a detection signal from the ultrasonic sensor modules 103.

A first top cover 105 and a second top cover 106 may be provided on the top of the outer cover 101. A stop switch 107 may be provided between the first top cover 105 and the second top cover 106. The stop switch 107 may be mounted on the outer cover 101 to be pressed. When the user presses the stop switch 107 one time in an emergency state, the stop switch 107 may be switched on so that the operation of the moving robot is stopped. When the stop switch 107 is pressed once more, the operation of the moving robot may be restarted.

The plurality of wheels 1092 may be connected respectively to driving motors provided in the inner body, and rotatably mounted on both side surfaces of the inner body 160 in a widthwise direction of the inner body 160. Each of the plurality of wheels 1092 may be connected to the driving motors by a driving shaft, so as to be rotatable by receiving power from the driving motors.

The plurality of wheels 1092 may supply power for the travel of the robot, and each of the plurality of wheels 1092 may be controlled by the control unit independently to be rotated by different RPM.

In addition, a handle 120 (which may also be referred to as a 'carrying handle') may be installed on the outer cover 101 so that the user can grip it with a hand while carrying the moving robot.

FIG. 2 illustrates a state where the moving robot according to the present disclosure performs communications with a terminal and a server. The moving robot 100 according to the present disclosure may exchange data with the terminal 200 through network communication. In addition, the moving robot 100 may perform a weeding-related operation or a corresponding operation according to a control command received from the terminal 200 through network communication or other communication.

Here, the network communication may refer to at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The illustrated network communication may vary depending on a communication method of the moving robot.

Figure 2A:
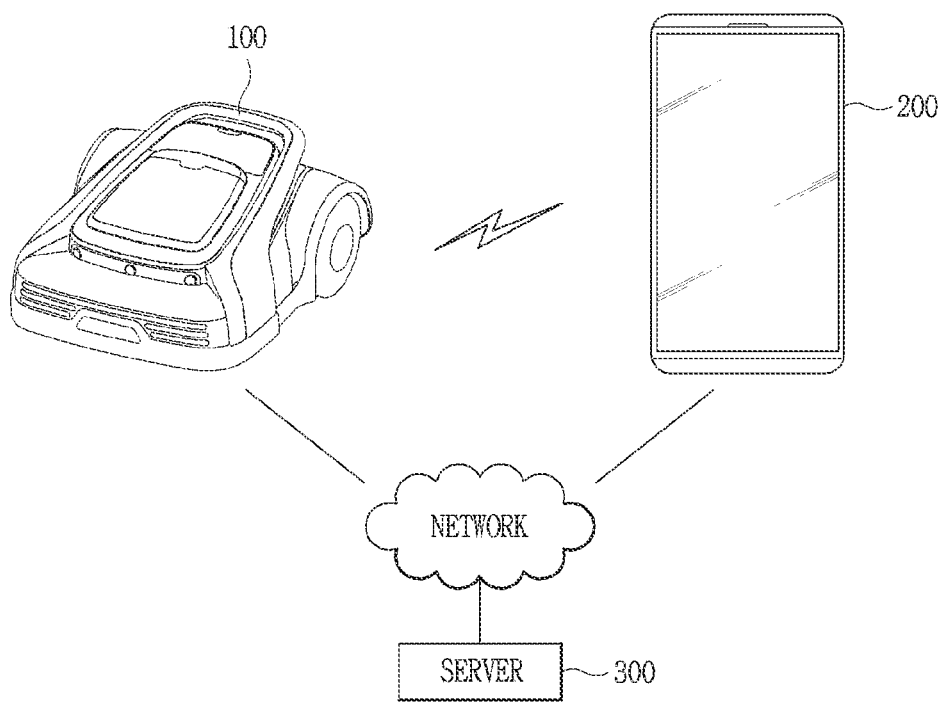
FIG. 2A is a conceptual view illustrating a state where the moving robot according to the present disclosure performs communications with a terminal and a server.

In FIG. 2A, the moving robot 100 may provide information sensed through each sensing unit to the terminal 200 through network communication. In addition, the terminal 200 may transmit a control command generated based on the received information to the moving robot 100 through the network communication.

On the other hand, the terminal 200 may be named as a controller, a remote controller, or the like, which is operated by a user to control operations related to the travel of the moving robot 100. To this end, the terminal 200 may be provided with an application installed therein for controlling operations related to the traveling of the moving robot 100, and the corresponding application may be executed through a user operation.

In FIG. 2A, a communication unit of the moving robot 100 and a communication unit of the terminal 200 may also directly communicate with each other or indirectly communicate with each other via another router (not shown), to recognize information related to a traveling operation of the moving robot and locations of the moving robot and the terminal.

Also, the moving robot 100, the server 300, and the terminal 200 may be connected via a network and exchange data with one another.

For example, the server 300 may exchange data with the moving robot 100 and/or the terminal 200, to register information related to a boundary set for the moving robot 100, map information based on the set boundary, obstacle information on the map. In addition, the server 300 may provide the registered information to the moving robot 100 and/or the terminal 200 according to a request.

The server 300 may be wirelessly connected to the moving robot 100 through the terminal 200. Alternatively, the server 300 may be connected to the moving robot 100 without passing through the terminal 200.

The server 300 may include a programmable processor and may include various algorithms. By way of example, the server 300 may be provided with algorithms related to performing machine learning and/or data mining. As an example, the server 300 may include a speech recognition algorithm. In this case, when receiving voice data, the received voice data may be output by being converted into data in a text format.

Meanwhile, the server 300 may store firmware information and driving information (course information, and the like) for the moving robot 100, and register product information related to the moving robot 100. For example, the server 300 may be a server managed by a cleaner manufacturer or a server managed by an open application store operator.

Figure 2B:
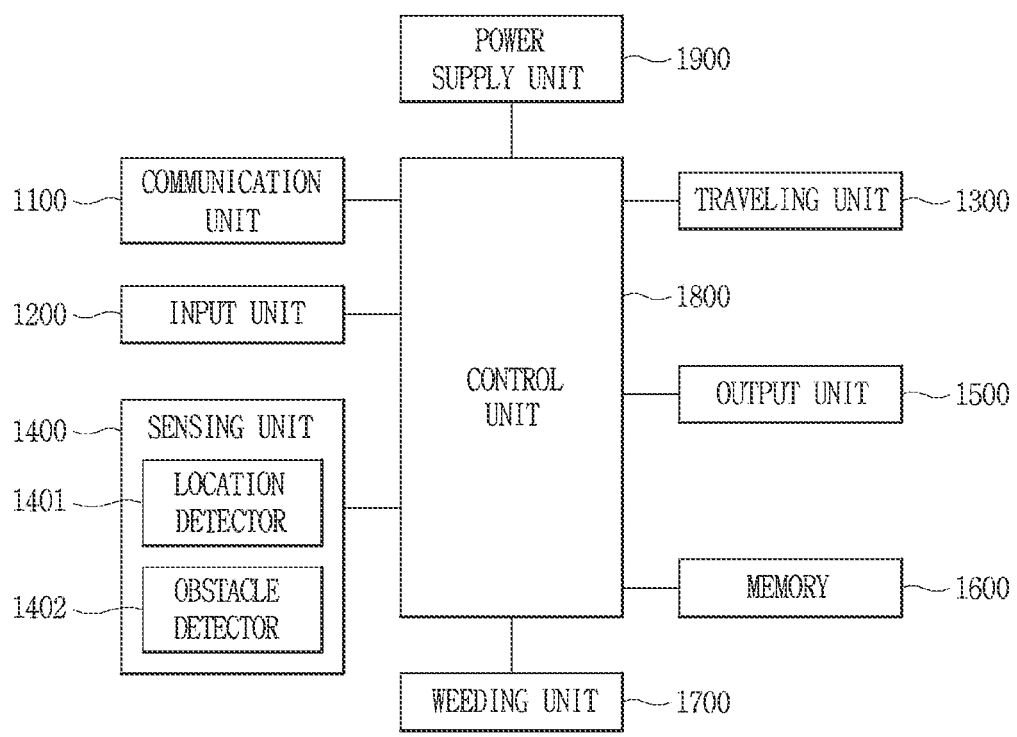
FIG. 2B is a block diagram illustrating an exemplary configuration of the moving robot according to the present disclosure.
Figure 2C:
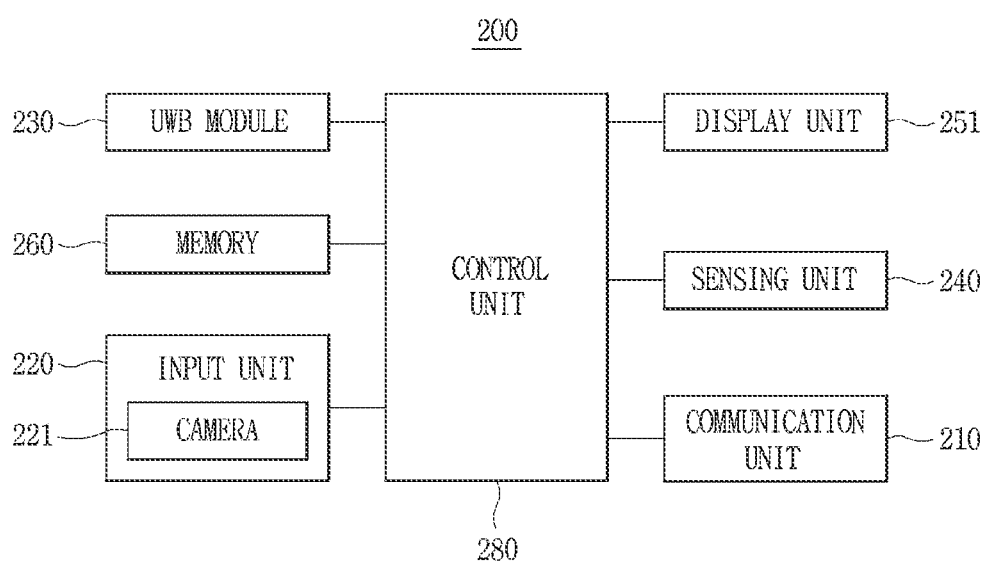
FIG. 2C is a block diagram illustrating an exemplary configuration of the terminal performing communication with the moving robot according to the present disclosure.

Hereinafter, FIG. 2B is a block diagram illustrating an exemplary configuration of the moving robot 100 according to the present disclosure, and FIG. 2C is a block diagram illustrating an exemplary configuration of the terminal 200 communicating with the moving robot 100.

First, the configuration of the moving robot 100 will be described in detail with reference to FIG. 2B.

As illustrated in FIG. 2B, the moving robot 100 may include a communication unit 1100, an input unit 1200, a traveling unit 1300, a sensing unit 1400 provided with a location detector 1401 and an obstacle detector 1402, an output unit 1500, a memory 1600, a weeding unit 1700, a control unit 1800, and a power supply unit 1900.

The communication unit 1100 may perform communication with the terminal 200 through a wireless communication scheme. Also, the communication unit 1100 may perform communication with the terminal which is connected to a predetermined network to control an external server or the moving robot.

The communication unit 1100 may transmit information related to a generated map to the terminal 200. The communication unit 1100 may receive a command from the terminal 200 and transmit data regarding an operation state of the moving robot 100 to the terminal 200.

The communication unit 1100 transmits and receives data by being equipped with a communication module such as Wi-Fi, WiBro, and the like, as well as through short-range wireless communications such as Zigbee and Bluetooth. In addition, the communication unit 1100 may include a UWB module for transmitting an UWB signal.

The input unit 1200 may include an input element such as at least one button, a switch, and a touch pad. The output unit 1500 may include an output element such as a display unit and a speaker. When the output unit 1500 is used simultaneously as the input element and the output element, a user command can be input and the operation state of the moving robot can be output through the display unit or the speaker.

The memory 1600 may store therein an input detection signal, reference data for determining an obstacle, and obstacle information regarding a detected obstacle. The memory 1600 may also store therein control data for controlling the operation of the moving robot and data according to a cleaning mode of the moving robot.

The memory 1600 may store therein collected location information, and information related to a travel area and its boundary. For example, the memory 1600 may store data that is readable by a microprocessor, and may be one of a hard disk drive (HDD), a solid state disk (SSD), a silicon disk drive (SDD), ROM, RAM, CD-ROM, a magnetic tape, a floppy disk, or an optical data storage device.

The traveling unit 1300 may include at least one driving motor, and may allow the moving robot to move according to a control command of the control unit 1800. The traveling unit 1300 may include a left wheel driving motor for rotating the left wheel and a right wheel driving motor for rotating the right wheel. In addition, the traveling unit 1300 may further include one or more auxiliary wheels for stable support.

For example, while the moving robot main body travels, the left wheel driving motor and the right wheel driving motor may be rotated in the same direction. A traveling direction of the moving robot main body (or moving robot) 100 may be switched when the left wheel driving motor and the right wheel driving motor are rotated at different speeds or in opposite directions.

The weeding unit 1700 cuts the lawn on a bottom surface while the moving robot is traveling. The weeding unit 1700 is provided with a brush or blade for cutting the lawn, and cuts the lawn on the bottom surface in a rotating manner. The obstacle detector 1402 may include a plurality of sensors for detecting obstacles existing in front of the moving robot. The obstacle detector 1402 may detect obstacles in front of the main body, namely, in the traveling direction of the moving robot, using at least one of a laser, ultrasonic waves, infrared rays, and a 3D sensor.

In addition, the obstacle detector 1402 may include a camera for capturing the front of the moving robot so as to detect an obstacle. The camera is a digital camera, which may include an image sensor (not shown) and an image processor (not shown). An image sensor is an apparatus for converting an optical image into an electrical signal. The image sensor is configured as a chip on which a plurality of photo diodes is integrated, and the photodiode may be a pixel, for example. Electric charges are accumulated in the respective pixels by an image, which is formed on the chip by light passing through a lens, and the electric charges accumulated in the pixels are converted into an electrical signal (for example, voltage). Charge Coupled Device (CCD), Complementary Metal Oxide Semiconductor (CMOS), and the like are well known as image sensors. In addition, a DSP or the like may be provided as the image processor.

The location detector 1401 includes a plurality of sensor modules for transmitting and receiving location information. The location detector 1401 includes a GPS module that transmits and receives GPS signals or a location sensor module that transmits and receives location information to and from a location information transmitter 50 (see FIG. 3). For example, the location detector 140 is provided with a sensor module that transmits and receives an ultrasonic, UWB, or infrared signal when the location information transmitter transmits a signal through one of ultrasonic wave, Ultra-Wideband (UWB), and infrared ray.

When the location sensor module is implemented as a UWB sensor module, even if an obstacle exists between the location information transmitter 50 and the moving robot 100, signals can be transmitted and received through such an obstacle or the like. Therefore, transmission and reception of the UWB signals are smoothly carried out.

Unless otherwise mentioned, it may be premised that the location information transmitter 50 and the moving robot 100, the location information transmitter 50 and the terminal 200, and the moving robot 100 and the terminal 200 are provided with at least one UWB sensor module so as to transmit and receive the UWB signals to and from each other.

Also, even when the moving robot 100 moves while following the terminal 200, the location may be determined using the sensor module.

For example, when the moving robot 100 travels while following the terminal 200, the terminal and the moving robot each include a UWB sensor and perform wireless communication with each other. The terminal may transmit a signal from its UWB sensor. The moving robot may receive the signal of the terminal through its UWB sensor and determine the location of the terminal based on the signal of the terminal so as to follow the terminal.

As described above, since the UWB signal transmitted by the UWB sensor can pass through an obstacle, the signal transmission is not affected even if the user moves while holding the terminal. However, in the case of an obstacle having a designated size or more, the signal transmission may be failed or a signal transmission distance may be reduced even if the signal is transmitted through the obstacle.

In addition, the UWB sensors provided in the terminal and the moving robot, respectively, may estimate or measure a distance between them. When the moving robot follows the terminal, the travel of the moving robot is controlled according to a distance from the terminal, so that the moving robot does not move away from the terminal by a predetermined distance. That is, the moving robot may follow the terminal while maintaining a proper distance so that the distance from the terminal is not too close or too far away.

The location detector 1401 may include one UWB sensor or a plurality of UWB sensors. For example, when the location detector 1401 includes two UWB sensors, for example, the two UWB sensors may be provided on left and right sides of the main body of the moving robot, respectively, to receive signals. Accordingly, the location detector 1401 may detect the location by comparing the received signals.

For example, when the distances measured respectively by the left sensor and the right sensor are different according to the locations of the moving robot and the terminal, relative locations of the moving robot and the terminal and a direction of the moving robot may be determined based on the distances.

Meanwhile, in addition to the obstacle detector 1402 and the location detector 1401, the sensing unit 1400 may include various sensors, such as a cliff detection sensor installed on a rear surface of the main body to detect a cliff, a rain sensor to detect a humid or rainy weather condition, a proximity sensor, a touch sensor, an RGB sensor, a fuel gauge sensor, an acceleration sensor, a geomagnetic sensor, a gravity sensor, a gyroscope sensor, an illuminance sensor, an environmental sensor (a thermometer, a radiation detection sensor, a heat detection sensor, a gas detection sensor, etc.), a plurality of 360-degree sensors, a floor state detection sensor, and the like.

In addition, the sensing unit 1400 may include at least one tilt sensor (not shown) for detecting movement of the main body. The tilt sensor calculates a tilted direction and a tilted angle of the main body when the main body is tilted in a front, rear, left, or right direction. The tilt sensor may be an acceleration sensor, or the like. In the case of the acceleration sensor, any of a gyro type, an inertial type, and a silicon semiconductor type is applicable. In addition, various sensors or devices capable of detecting the movement of the main body may be used.

The control unit 1800 controls data input/output, and controls the traveling unit 1300 so that the moving robot travels according to settings. The control unit 1800 controls the traveling unit 1300 to independently control the operations of the left wheel driving motor and the right wheel driving motor, so that the main body of the moving robot 100 travels straight or rotate.

The control unit 1800 determines a traveling direction corresponding to a signal received through the sensing unit 1400 and controls the traveling unit 1300. In addition, the control unit 1800 controls the traveling unit 1300 to vary a traveling speed, so that the moving robot travels or stops according to the distance from the terminal. Accordingly, the moving robot can move while following locations of the terminal corresponding to the changes in location of the terminal.

In addition, the control unit 1800 may control the moving robot to move, following the terminal 200, according to a set mode.

The control unit 1800 may set a virtual boundary for an area based on location information received from the terminal 200 or location information calculated through the location detector 1401. Also, the control unit 1800 may set any one of areas formed by set boundaries as a travel area. The control unit 1800 sets a boundary in a shape of a closed loop by connecting discontinuous location information with lines or curves, and sets an inner area of the set boundary as the travel area. Also, when a plurality of boundaries is set, the control unit 1800 may set any of areas formed by the plurality of boundaries as a travel area.

When the boundary and the travel area are set, the control unit 1800 controls the traveling unit 1300 so that the moving robot travels within the travel area without moving over the set boundary. The control unit 1800 calculates a current location based on received location information, and controls the traveling unit 1300 so that the calculated current location is located within the travel area set by the boundary.

In addition, the control unit 1800 may determine obstacle information input by the obstacle detector 1402 and travel avoiding obstacles. Also, the control unit 1800 may modify a preset travel area, if necessary, based on the obstacle information.

For example, the control unit 1800 may control the traveling unit 1300 to travel by passing through an obstacle or avoiding the obstacle, by way of changing a moving direction or a travel path in correspondence with obstacle information input from the obstacle detector.

The control unit 1800 may set the moving robot so as not to approach a cliff by a predetermined distance or closer when the cliff is detected. In addition, the control unit 1800 may change a traveling direction according to a user selection, which is input through the terminal 200, by way of transmitting traveling information regarding a detected obstacle to the terminal 200 and displaying such information on the terminal.

The power supply unit 1900 includes a rechargeable battery (or battery module) (not shown). The battery may be detachably mounted to the moving robot 100. When it is detected through the sensing unit 1400 that the battery gauge is insufficient, the control unit 1800 may control the traveling unit 1300 to move the moving robot to the location of a charging station for recharging the battery. When presence of the charging station is detected by the sensing unit 1400, recharging of the battery is performed.

Hereinafter, the main configuration of the terminal 200 that performs communication with the moving robot 100 according to the present disclosure will be described, with reference to FIG. 2C.

Referring to FIG. 2C, the terminal 200 may include a mobile terminal that can be carried by a user and may include a communication unit 210, an input unit 220, a UWB module 230, a sensing unit 240, a display unit 251, a memory 260, and a control unit 280.

The communication unit 210 may perform communication with an external server or the moving robot 100 through wireless communication. The communication unit 210 transmits and receives data by being equipped with a communication module such as Wi-Fi, WiBro, and the like, as well as through short-range wireless communications such as Zigbee and Bluetooth. In addition, the communication unit 210 may include a UWB module for transmitting a UWB signal.

The input unit 220 may include an input element such as at least one button, a switch, and a touch pad.

Also, the input unit 220 is configured to permit various types of inputs to the wearable device 100. Examples of such inputs include image information (or signal), audio information (or signal), data or various information input by a user, and may be provided with one or a plurality of cameras 221.

Such cameras 221 may process image frames of still pictures or videos obtained by image sensors in an image capture mode. The processed image frames may be displayed on the display unit 251 or stored in memory 170. Meanwhile, the cameras 221 provided in the terminal 200 may be arranged in a matrix configuration to permit a plurality of images having various angles or focal points to be input to the terminal 200. Also, the cameras 221 may be located in a stereoscopic arrangement to acquire left and right images for implementing a stereoscopic image.

The camera 221 typically includes at least one a camera sensor (CCD, CMOS, etc.), a photo sensor (or image sensors), and a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 251 may include a touch sensor to receive a control command through a touch input. In addition, the display unit 251 may be configured to output a control screen for controlling the moving robot 100, and a map screen on which a set boundary and the location of the moving robot 100 are displayed.

The memory 260 may store therein data related to the travel of the moving robot 100. In addition, the memory 260 may store therein location information regarding the moving robot 100 and the terminal 200, and information regarding a travel area of the moving robot and a boundary of the travel area. For example, the memory 1600 may store data that is readable by a microprocessor, and may be one of a hard disk drive (HDD), a solid state disk (SSD), a silicon disk drive (SDD), ROM, RAM, CD-ROM, a magnetic tape, a floppy disk, or an optical data storage device.

The sensing unit 240 includes a location detector (not shown) for transmitting and receiving location information, and at least some of a gyro sensor and an acceleration sensor for sensing a change in spatial motion of the terminal 200, a geomagnetic sensor, and an IMU (Inertia Measurement Unit) sensor. At this time, the gyro sensor and the acceleration sensor may be implemented as any one of 3-axis, 6-axis, or 9-axis gyro sensor and acceleration sensor.

The location detector includes a plurality of sensor modules for transmitting and receiving location information. For example, the location detector may include a GPS module, an Ultra-Wideband (UWB) module, a geomagnetic sensor, an acceleration sensor, a gyro sensor, and the like, to recognize coordinates of a point which is indicated by a posture change such as a tilt or the like, as well as a current location of the terminal 200.

The UWB module 230 which is included in the location detector or separately provided may exchange UWB signals with the moving robot 100 and/or the location information transmitter 50. Accordingly, not only the location of the terminal 200 but also the location of the moving robot 100 with respect to the terminal 200, the location of the location information transmitter 50 with respect to the terminal 200, the location of the location information transmitter 50 with respect to the moving robot 100, and the like can be recognized.

The acceleration sensor is a sensor that measures how much force an object is receiving based on gravitational acceleration of the earth. A three-axis acceleration sensor refers to a sensor capable of measuring magnitude of acceleration in x, y, and z-axial directions. Such an acceleration sensor may be used as one three-axis acceleration sensor, a six-axis acceleration sensor with two three-axis acceleration sensors applied, or a nine-axis acceleration sensor with three three-axis acceleration sensors applied.

By using a sensing value of the three-axis acceleration sensor, roll (rotation with respect to the x axis) and pitch (rotation with respect to the y axis) may be calculated. A unit used is [g]. On the other hand, rotation with respect to the z axis coinciding with the direction of gravitational acceleration, that is, a yaw (rotation with respect to the z axis) value may be calculated only by additionally applying a three-axis gyro sensor or a magnetometer. Also, in a motion state in which an object is not stopped, a tilt value cannot be detected by only the three-axis acceleration sensor.

The three-axis gyro sensor is a sensor for controlling posture of an object, namely, a sensor capable of measuring angular velocity in the x, y, and z-axial directions. Here, the angular velocity refers to an angle of rotation per hour. A unit used is [degree/sec].

The IMU sensor is a combined sensor of a three-axis acceleration sensor and a three-axis gyro sensor. Alternatively, the IMU sensor is a nine-axis sensor with a three-axis acceleration sensor, a three-axis gyro sensor, and a three-axis geomagnetic sensor. By using such an IMU sensor, the roll, the pitch and the yaw can all be calculated.

The UWB module 230 may transmit or receive a UWB signal through a UWB module provided in the moving robot 100. The terminal 200 may play a role of 'remote control device' in that it can control the travel or weeding operation of the moving robot 100 through communication with the moving robot 100.

In addition to the UWB module 210, the terminal 200 may further include a distance measuring sensor.

The distance measuring sensor may emit at least one of a laser light signal, an IR signal, an ultrasonic signal, a carrier frequency, and an impulse signal, and may calculate a distance from the terminal 200 to the corresponding signal based on a reflected signal.

To this end, the distance measuring sensor may include, for example, a time of flight (ToF) sensor. For example, the ToF sensor may include a transmitter that emits an optical signal transformed to a specific frequency, and a receiver that receives and measures a reflected signal. When the ToF sensor is installed on the terminal 200, the transmitter and the receiver may be spaced apart from each other to avoid signal affection therebetween.

Hereinafter, the laser light signal, the IR signal, the ultrasonic signal, the carrier frequency, the impulse signal, and the UWB signal described above may collectively be referred to as 'signal'. In this specification, 'UWB signal' which is rarely affected by an obstacle will be exemplarily described. Therefore, it can be said that the distance measuring sensor plays a role of calculating a distance from the terminal 200 to a point where a signal is emitted. In addition, the distance measuring sensor may include a transmitter that emits signals and one receiver or a plurality of receivers for receiving reflected signals.

Figure 3:
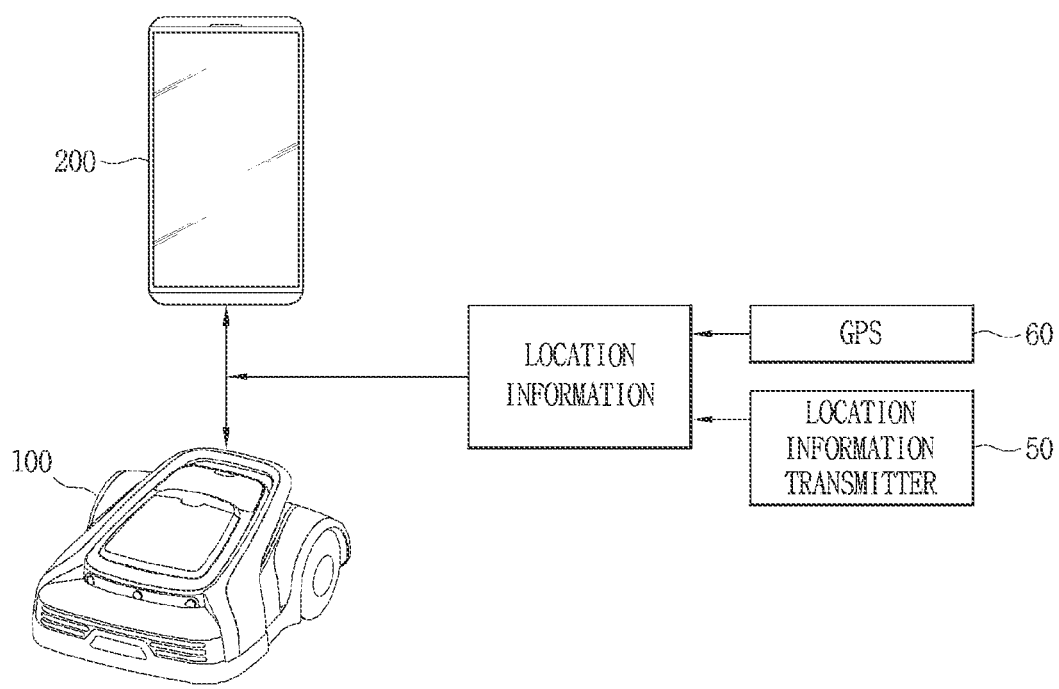
FIG. 3 is a conceptual view illustrating a signal flow between devices for setting a boundary for the moving robot, in accordance with an embodiment of the present disclosure.

Hereinafter, FIG. 3 is a conceptual view illustrating a signal flow of devices for setting a boundary with respect to a moving robot, for example, a signal flow of the moving robot 100, the terminal 200, a GPS 60, and the location information transmitter 50.

When the location information transmitter 50 transmits a signal by its UWB sensor, the terminal 200 may receive a signal related to location information from the location information transmitter 50 through a UWB module provided in the terminal 200 itself. At this time, a signaling method of the location information transmitter 50 and a signaling method between the moving robot 100 and the terminal 200 may be the same or different from each other.

For example, the terminal 200 may transmit ultrasonic waves and the moving robot 100 may receive the ultrasonic waves of the terminal 200 to follow the terminal 200. As another example, a marker may be attached on the terminal 200. The moving robot 100 may recognize the marker attached on the terminal 200 by capturing a moving direction of the terminal, so as to follow the terminal 200.

In FIG. 3, location information may be received from the location information transmitter 50 or the GPS 60. A GPS signal, an ultrasonic signal, an infrared signal, an electromagnetic signal, or a UWB signal may be used as a signal corresponding to the location information.

The moving robot needs to collect location information for setting a travel area and a boundary. The moving robot 100 may collect location information by setting any one point of an area as a reference location. At this time, a location of any one of an initial start point, the charging station, and the location information transmitter 50 may be set as the reference location. The moving robot 100 may generate coordinates and a map for the area on the basis of the set reference location and store the generated coordinates and map. When the map is generated and stored, the moving robot 100 may move based on the map.

In addition, the moving robot 100 may set a new reference location at every operation, and determine a location within the area based on the newly-set reference location.

Also, the moving robot 100 may receive location information collected from the terminal 200 which is moving along a predetermined path. The terminal 200 may move arbitrarily and its moving path may change according to a subject which moves the terminal. However, in order to set a travel area of the moving robot, the terminal 200 may preferably move along an outer side of the travel area.

The terminal 200 calculates coordinates of a location within an area based on a reference location. In addition, the moving robot 100 may collect location information while moving with following the terminal 200.

When the terminal 200 or the moving robot 100 travels along a predetermined path alone, the terminal 200 or the moving robot 100 may calculate a current location based on a signal transmitted from the GPS 60 or the location information transmitter 50.

The moving robot 100 and the terminal 200 may move by setting the same reference location with respect to a predetermined area. When the reference location is changed at every operation, the reference location set with respect to the terminal 200 and location information collected from the reference location may be transmitted to the moving robot 100. The moving robot 100 may set a boundary based on the received location information.

Meanwhile, the moving robot 100 and the terminal 200 may determine their relative locations using Ultra-wide Band (UWB) technology. To this end, one of UWB modules may be a UWB anchor and the other one may be a UWB tag.

For example, the UWB module 230 of the terminal 200 may operate as 'UWB tag' that emits an UWB signal, and the UWB module of the moving robot 100 may operates as 'UWB anchor' that receives a UWB signal.

However, it should be noted that the present disclosure is not limited to this. For example, the UWB module 230 of the terminal 200 may operate as an UWB anchor, and the UWB module of the moving robot 100 may operate as a UWB tag. In addition, the UWB module may include one UWB anchor and a plurality of UWB tags.

Hereinafter, description will be given of a method in which the moving robot 100 and the terminal 200 determine (recognize) their relative locations through a UWB communication technology. First, a distance between the moving robot 100 and the terminal 200 is calculated using a distance measurement technology such as a ToF (Time of Flight) scheme.

Specifically, a first impulse signal, which is a UWB signal radiated (emitted) from the terminal 200, is transmitted to the moving robot 100. To this end, the UWB module of the terminal 200 may operate as 'UWB tag' for transmission and the UWB module of the moving robot 100 may operate as 'UWB anchor' for reception. Here, the UWB signal (or the impulse signal) can be smoothly transmitted and received even if an obstacle exists in a specific space, and the specific space may have a radius of several tens of meters (m).

The first impulse signal may be received through the UWB anchor of the moving robot 100. The moving robot 100 which has received the first impulse signal transmits a response signal to the terminal 200. Then, the terminal 200 may transmit a second impulse signal, which is an UWB signal with respect to the response signal, to the moving robot 100. Here, the second impulse signal may include delay time information which is calculated based on a time at which the response signal has been received and a time at which the second impulse signal has been transmitted responsive to the response signal.

The control unit of the moving robot 100 may calculate a distance between the moving robot 100 and the terminal 200, based on a time at which the response signal has been transmitted, a time at which the second impulse signal has been arrived at the UWB anchor of the moving robot 100, and the delay time information included in the second impulse signal.

$$\text{Distance} = c * t - t_1 - t_{reply}/2$$

Here, $t_2$ denotes an arrival time of the second impulse signal, $t_1$ denotes a transmission time of the response signal, $t_{reply}$ denotes a delay time, and c denotes a constant value indicating a speed of light.

As such, the distance between the moving robot 100 and the terminal 200 can be determined by measuring a time difference between signals transmitted and received between the UWB tag and the UWB anchor included in the moving robot 100 and the terminal 200, respectively.

A distance between the moving robot 100 and the location information transmitter 50 and a distance between the terminal 200 and the location information transmitter 50 can also be determined in the same or similar manner.

Hereinafter, an operation of setting a boundary with respect to the moving robot 100 using the location information transmitter 50 and the terminal 200 without laying wires under the ground will be described, with reference to FIGS. 4A to 4C.

In this manner, a boundary which is a reference of a travel area may be set using the location information transmitter 50, the terminal 200, and the moving robot 100, or using only the location information transmitter 50 and the moving robot 100, without embedding wires. A travel area which is distinguished by the boundary may be referred as to 'wireless area.'

The 'wireless area' may be one or plural. In addition, one wireless area may include a plurality of spot areas additionally set in the corresponding area, so that a mowing function performed by the moving robot 100 can be performed more efficiently.

A boundary must be set so that the moving robot 100 can perform mowing while moving in a travel area set outdoors. Then, a travel area, namely, a wireless area in which the moving robot 100 is to travel is designated inside the set boundary.

Figure 4A:
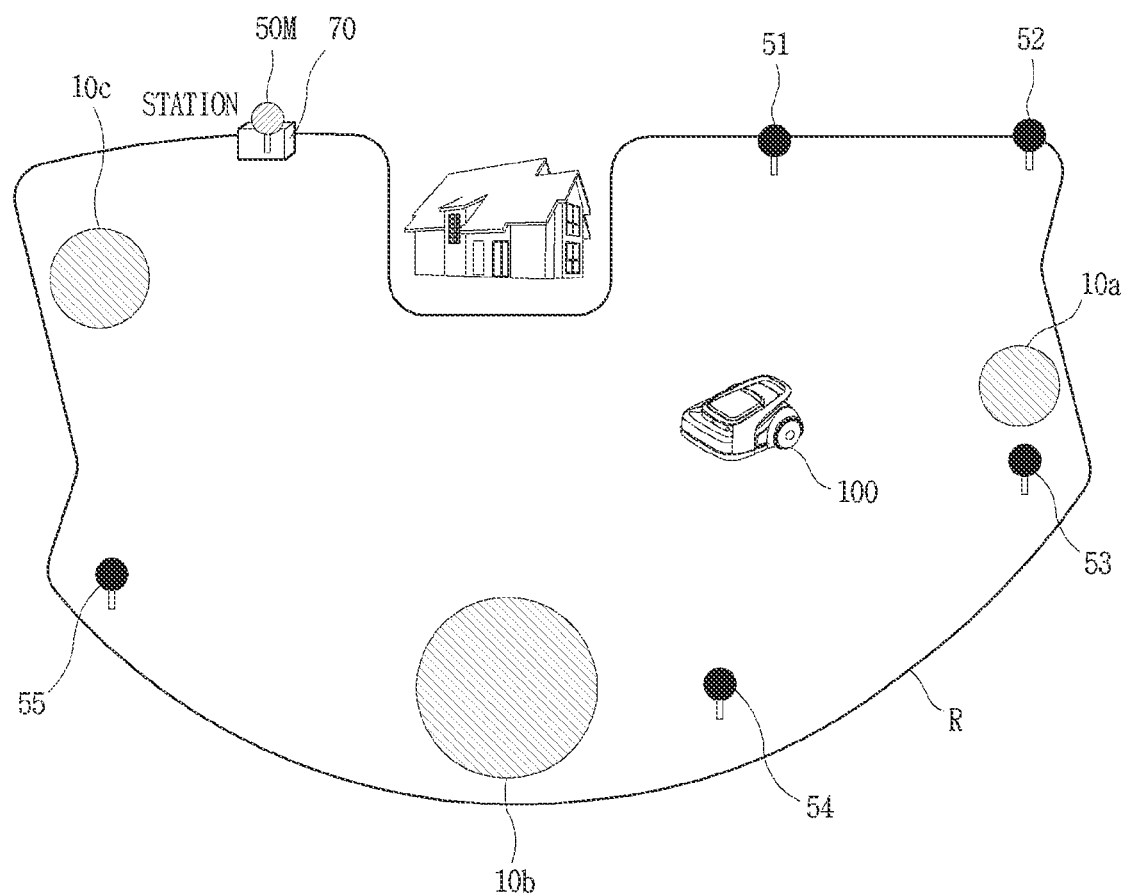
FIGS. 4A, 4B and 4C are conceptual views related to setting a virtual boundary for the moving robot without laying wires under the ground, in accordance with an embodiment of the present disclosure.

Referring to FIG. 4A, there may be various obstacles 10a, 10b, and 10c at the outdoors in addition to a house illustrated in the drawing. Here, the obstacles 10a, 10b, and 10c may include, for example, fixed obstacles such as a building, a rock, a tree, a swimming pool, a pond, a statue, a garden, and the like, which exist at the outdoors, and obstacles that move. Also, size and shape of the obstacles 10a, 10b, and 10c may be very various.

If the obstacles are present close to the set boundary, the boundary must be set, from the beginning, to avoid these various obstacles 10a, 10b, 10c.

However, as illustrated in FIG. 4A, when the obstacles 10a, 10b, and 10c exist within a travel area set based on a boundary R, additional boundaries for the respective obstacles 10a, 10b, and 10c should be set or the previously-set boundary should be changed through the same or similar process to the method of setting the travel area inside the boundary R.

Also, in the present disclosure, a plurality of location information transmitters 50M, 51, 52, 53, 54, and 55 may be installed in advance in a predetermined area, in order to set a boundary without laying wires.

The plurality of location information transmitters 50M, 51, 52, 53, 54, and 55 may transmit signals. Specifically, the plurality of location information transmitters 50M, 51, 52, 53, 54, and 55 may transmit signals to one another or may transmit signals to the moving robot 100 and/or the terminal 200.

Here, the signals may include, for example, UWB signals, ultrasonic signals, infrared signals, Bluetooth signals, Zigbee signals, or the like.

At least three of the plurality of location information transmitters 50M, 51, 52, 53, 54, and 55 may be installed in a spaced manner. Also, the plurality of location information transmitters 50M, 51, 52, 53, 54, and 55 may be installed at high points higher than a reference height, in order to minimize signal interference when the UWB sensor is not included.

The plurality of location information transmitters 50M, 51, 52, 53, 54, and 55 is preferably installed at locations adjacent to a boundary to be set. The plurality of location information transmitters 50M, 51, 52, 53, 54, and 55 may be installed outside or inside a boundary to be set.

For example, FIG. 4A illustrates a plurality of location information transmitters 50M, 51, 52, 53, 54, and 55 installed inside the boundary R, but the present disclosure is not limited thereto. For example, the plurality of location information transmitters 50M, 51, 52, 53, 54 and 55 may be installed outside the boundary R, or some may be installed inside the boundary R and the others outside the boundary R.

When the location information transmitter 50M, 51, 52, 53, 54, 55 includes a UWB sensor, the UWB sensor may transmit and receive UWB signals to and from the moving robot 100 and/or the terminal 200 located in a predetermined area, so as to calculate location information regarding the moving robot 100 and/or the terminal 200.

For example, the moving robot 100 may calculate the location of the moving robot 100 by comparing amounts/intensities of signals of the plurality of location information transmitters 50M, 51, 52, 53, 54, and 55 and determining a spaced distance and direction from each location information transmitter. A method of calculating location information regarding the terminal 200 may be similarly performed.

At least one of the plurality of location information transmitters 50M, 51, 52, 53, 54, and 55 may be a reference location information transmitter 50M for setting a boundary. The reference location information transmitter 50M may be installed at a place where a charging station 70 is located, for example, as illustrated in FIG. 4A.

coordinates values of the plurality of location information transmitters 50M, 51, 52, 53, 54, and 55 may be set based on the reference location information transmitter 50M. More specifically, the location information transmitter 50M may transmit and receive signals to and from the remaining location information transmitters 51, 52, 53, 54, and 55, to calculate x and y coordinate values corresponding to the locations of the remaining location information transmitters, with respect to the reference location information transmitter as a zero point. Accordingly, the location information regarding the plurality of location information transmitters 50M, 51, 52, 53, 54, and 55 can be set.

When the moving robot 100 sets the charging station 70 where the reference location information transmitter 50M is located as an operation start point, it may be easier to determine (recognize) the location of the moving robot 100 at every operation. Also, when a battery gauge is insufficient during the travel of the moving robot 100, the moving robot 100 may move to the reference location information transmitter 50M where the charging station 70 is located and charge the battery.

When the reference location information transmitter 50M is installed at a place where the charging station 70 is located, it is not necessary to set the location of the charging station 70 separately.

On the other hand, when the moving robot 100 becomes significantly far away from the reference location information transmitter 50M as it keeps traveling, the reference location information transmitter may be changed to another location information transmitter which is located close to a current location of the moving robot, based on amounts/intensities of signals transmitted from the plurality of location information transmitters 50M, 51, 52, 53, 54, and 55.

On the other hand, unlike FIG. 4A, when the charging station 70 is located outside the boundary R, that is, the boundary has been set at an inner side than the charging station 70, the moving robot 100 may return to the charging station over the boundary for recharging the battery.

However, when the charging station 70 is located outside the boundary, a moving area (not shown) may be additionally set between the charging station 70 and the travel area set within the boundary, so as to guide the moving robot 100 to return to the charging station 70 located outside the boundary.

Hereinafter, FIG. 4B exemplarily illustrates a method of setting a boundary for the moving robot 100 and a travel area with respect to the boundary, by using the plurality of location information transmitters 50M, 51, 52, 53, 54, and 55 and the terminal 200.

First, the terminal 200 moves from the location information transmitter 55 along a first path 401 at an outer side of an area, in which lawn is planted. At this time, the terminal 200 may be moved by a person, but may also be moved by another transportation device such as a drone.

The terminal 200 may determine a current location through the location information transmitter 55 or a GPS. As the mobile terminal 200 moves, a distance and direction to each location information transmitter may be calculated based on signals transmitted from the other location information transmitters 51 to 54. Accordingly, coordinates of the plurality of points corresponding to the change of the location of the terminal 200 may be recognized and stored as location information.

In this regard, each of the plurality of location information transmitters 50M, 51, 52, 53, 54, and 55 may transmit a UWB including unique information for identifying a signal. Accordingly, the terminal 200 can individually analyze and process a first signal 411 transmitted from the first location information transmitter 51, a second signal 412 transmitted from the second location information transmitter 52, a third signal 413 transmitted from the third location information transmitter 53, and a fourth signal 414 transmitted from the fourth location information transmitter 54.

In addition to this, the first to third location information transmitters 51 to 53 may transmit and receive signals 421 to 423 to the fourth location information transmitter 54, which is located close to the current location of the terminal 200, receive a response signal to the transmitted signals, and transmit a signal 424 corresponding to the response signal to the terminal. The terminal can check whether or not there is an error between the current location of the corresponding location information transmitter 54 and the predefined location (initially-installed point) based on the signal 424.

According to this, the location error of the location information transmitter can be checked together when the moving robot 100 moves for setting the travel area or the wireless area.

When the movement corresponding to the first path 401 is completed, for example, when the first path 401 forms a shape of a closed curve or reaches a designated end point, the terminal 200 transmits location information, which has been stored while moving along the first path 401, to the moving robot 100.

Then, the moving robot 100 may set a line, which sequentially connects the location information stored while the terminal 200 moves along the first path 401, or an outer line of the line, as a boundary R. In addition, the moving robot 100 may set an inner area of the first path 401 with respect to the set boundary R as a travel area or a wireless area.

The moving robot 100 may perform test traveling in the set travel area or wireless area. At this time, the boundary and/or the travel area may be partially modified by the moving robot 100. For example, the boundary and/or the travel area for the moving robot 100 may be partially modified in consideration of situation information, collected when a new obstacle is detected, when an existing obstacle is removed, when an uneven surface or a pothole is detected, or when a non-travelable spot due to the traveling function of the moving robot 100 is detected.

Figure 4B:
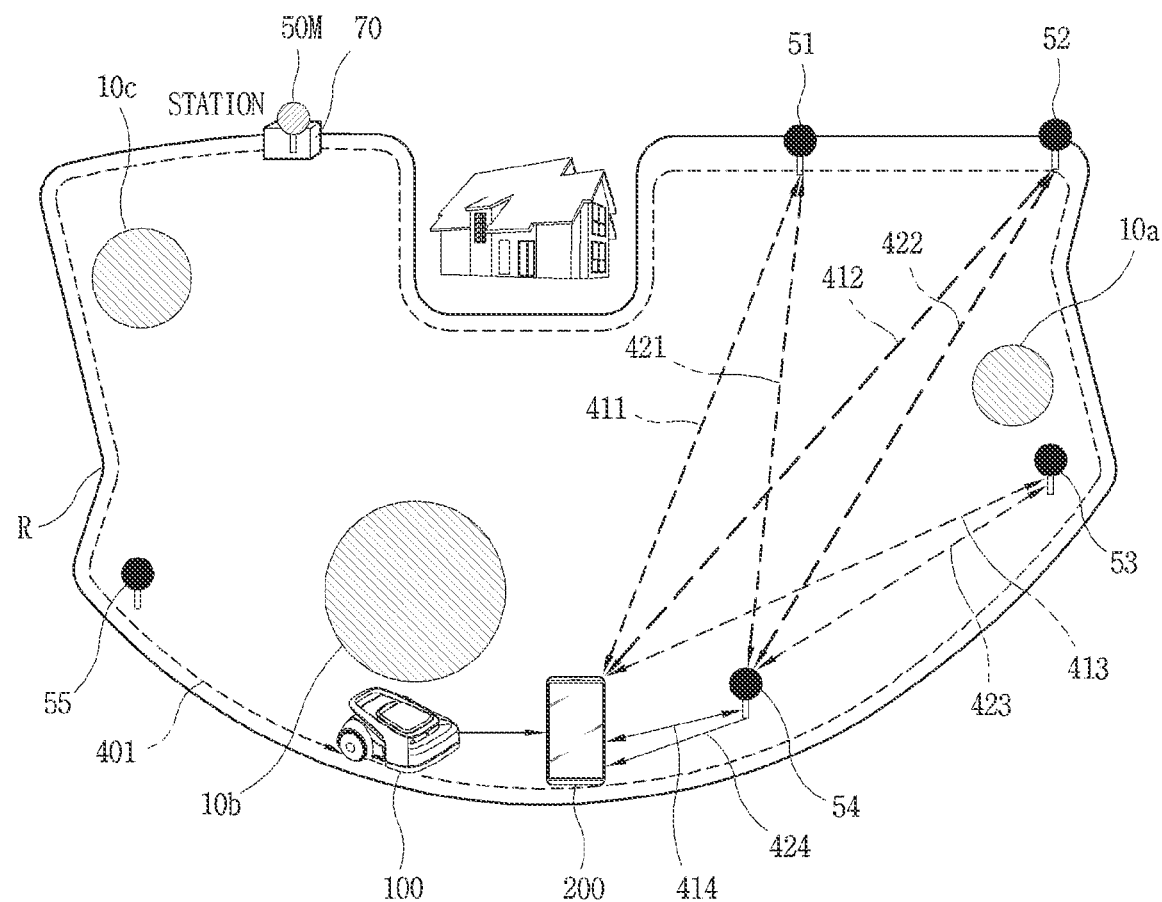

Or, as illustrated in FIG. 4B, the moving robot 100 follows the location of the terminal 200 at a predetermined distance while the terminal 200 moves along the first path 401, and accordingly the boundary and/or the travel area for the moving robot 100 can be set without additional test traveling.

At this time, there may be a difference between the first path 401 along which the terminal 200 has moved and the moving path of the moving robot 100 following the terminal 200. That is, the moving robot 100 can move, following the terminal 200, in a manner of ignoring or removing a location which the moving robot 100 cannot follow on the track of the first path 401, along which the terminal 200 has moved. In this case, the moving robot 100 may store the corresponding location change and may keep following the current location of the terminal 200 based on points corresponding to the location change.

When the distance between the terminal 200 and the moving robot 100 exceeds a predetermined distance as the traveling speed of the moving robot 100 is slowed due to obstacle avoidance or the like, a designated warning sound ('first warning sound') may be output from the moving robot 100 to notify the excess so that a user or the like moving the terminal 200 can stop the movement of the terminal 200.

Thereafter, when the moving robot 100 restarts to travel by avoiding obstacles and the like in a designated manner and accordingly the distance to the terminal 200 in the stopped state is reduced to be in a designated range again, a corresponding warning sound ('second warning sound') may be output from the moving robot 100 to notify it so that the user or the like moving the terminal 200 can perform the movement.

Meanwhile, FIG. 4B exemplarily illustrates that the location information regarding the moving robot 100 and/or the terminal 200 is calculated by the plurality of location information transmitters 50M, 51, 52, 53, 54, and 55 upon movement for setting the travel area or wireless area, but such location information may, of course, be calculated through GPS.

Figure 4C:
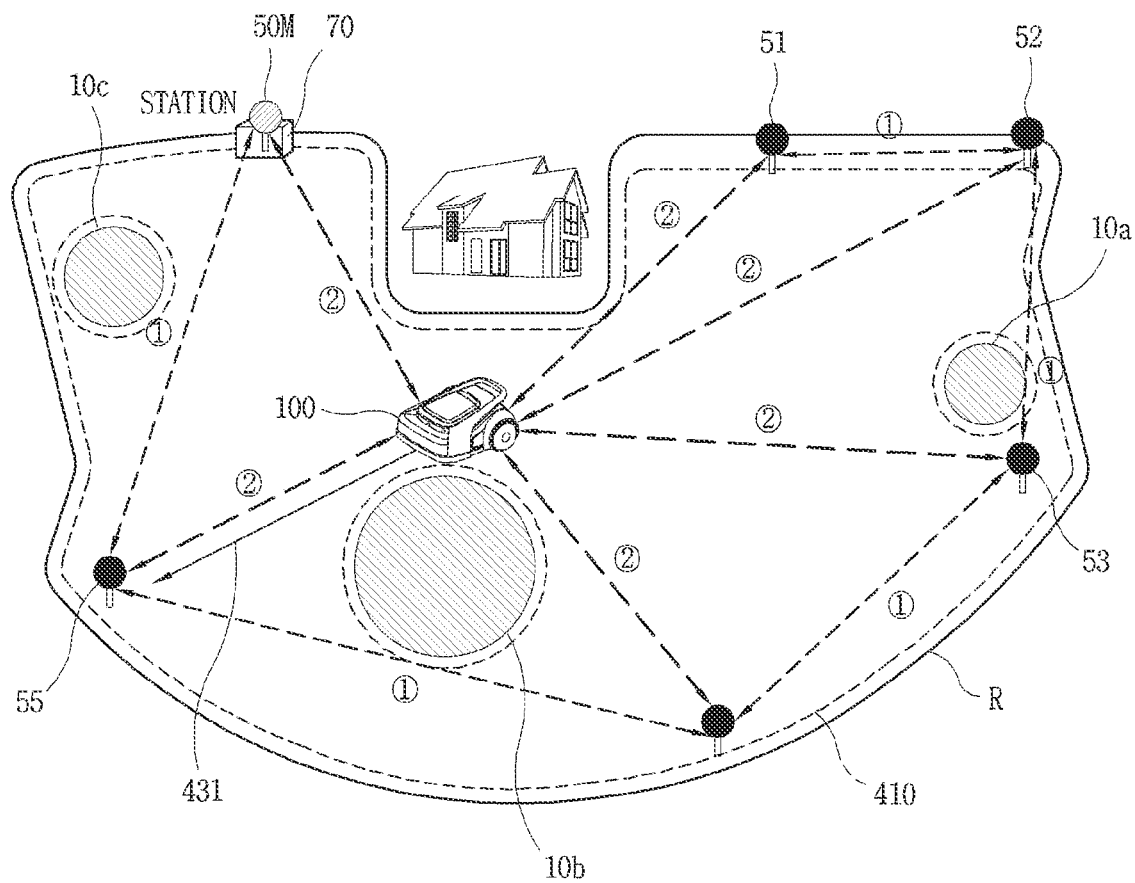

FIG. 4C exemplarily illustrates that additional boundaries for a plurality of obstacles 10a, 10b, and 10c existing in a travel area (or wireless area) 410 in a state where a boundary R and the travel area inside the boundary R have been set.

In FIG. 4C, if there are obstacles 10a, 10b, and 10c having a predetermined size or greater inside the set travel area 410, additional boundaries for the detected obstacles 10a, 10b, and 10c may be set.

The moving robot 100 (or the terminal 200 and the moving robot 100 or the terminal 200) may set additional boundaries and a travel area with respect to the additional boundaries by moving along outer peripheries of the obstacles 10a, 10b, and 10c in the same or similar manner as described above with reference to FIG. 4B.

In FIG. 4C, dashed lines formed at the outside of the obstacles 10a, 10b, 10c may indicate the additional boundaries. Unlike the boundary set in FIG. 4B, an inner side is set as a non-travelable area and an outer side as a travelable area, with respect to the set additional boundary.

Thus, the change of the travel area due to the setting of the additional boundary can be reflected in the modification of the existing boundary and travel area. A map corresponding to the existing boundary and travel area can also be modified accordingly.

The moving robot 100 may perform operations such as weeding and the like while moving in the travelable area within the travel area. While the moving robot 100 moves in the travelable area within the travel area, the plurality of location information transmitters 50M, 51, 52, 53, 54 and 55 transmit signals, for example, UWB signals ① to one another, thereby determining their locations. Also, the plurality of location information transmitters 50M, 51, 52, 53, 54 and 55 transmit signals, for example, UWB signals ② to the moving robot 100, so that the moving robot 100 can recognize its current location within the travel area.

Meanwhile, the moving robot 100 according to the present disclosure may determine (recognize) the relative location of a location information transmitter based on a UWB signal transmitted from the location information transmitter.

Hereinafter, a location information transmitter for transmitting a UWB signal will be referred to as "UWB tag". The moving robot 100 that receives the UWB signal transmitted from the location information transmitter and determines the relative location will be referred to as "UWB anchor". On the other hand, the location information transmitter may be replaced with another moving robot.

The moving robot 100 uses the AoA (Angle of Arrival) positioning technique to determine the relative location of the location information transmitter. Hereinafter, an AoA (Angle of Arrival) positioning technique will be described with reference to FIG. 5A.

Figure 5A:
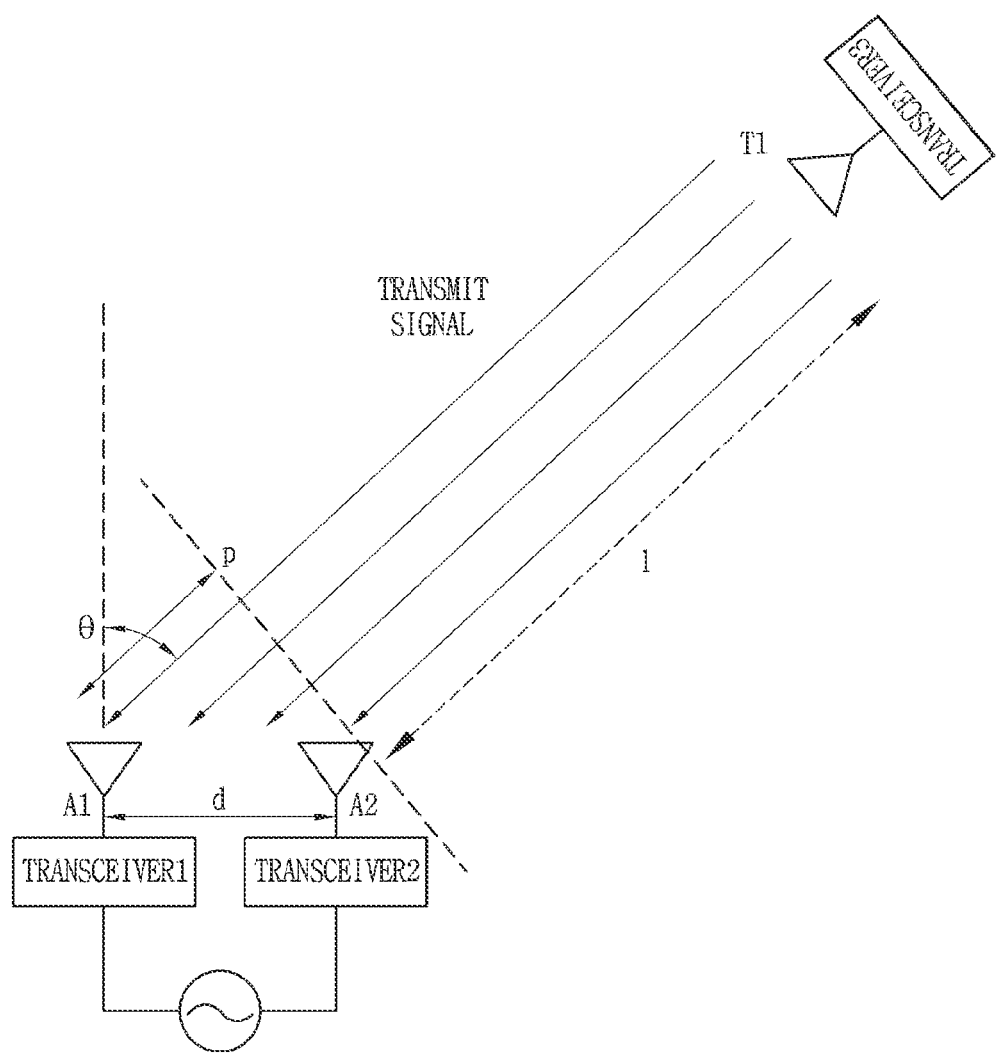
FIGS. 5A and 5B are views illustrating the concept and limitations of an AoA (Angle of Arrival) positioning technology.

Referring to FIG. 5A, the UWB anchor includes antennas A1 and A2 in a first transceiver and a second transceiver, respectively, for receiving UWB signals. The UWB tag T1 transmits the UWB signals through an antenna of a third transceiver (Transmit Signal). Then, the first antenna A1 and the second antenna A2 of the UWB anchor receive the UWB signals.

At this time, if a distance I between the UWB anchor and the UWB tag T1 is longer than a spaced distance d between the first antenna A1 and the second antenna A2 provided in the UWB anchor, an incident shape as shown in FIG. 5A is shown if the transmitted UWB signals are in the form of a plane wave.

Therefore, a distance difference is caused between the UWB signals incident on the first antenna A1 and the second antenna A2. The distance difference corresponds to p in FIG. 5A. An angle formed by a first line connecting the first antenna A1 and the second antenna A2 and a second line orthogonal to the first line is θ. Therefore, the angle θ may be calculated through the following Equation 1.

$$p = d\sin\theta \qquad \text{[Equation 1]}$$
$$\sin\theta = \frac{p}{d}$$

Meanwhile, the distance between the first antenna A1 or the second antenna A2 and the UWB tag T1 may be measured using two-way ranging. Two-way ranging is a method in which a transmitter and a receiver share their own time information while exchanging signals several times so as to eliminate a time error and thus measure a distance.

When the spaced distance 1 between the first antenna A1 or the second antenna A2 and the UWB tag T1 is known and the angle θ described above is obtained, a relative location of the UWB tag T1 with respect to the first antenna A1 and the second antenna A2 may be determined through the following Equation 2.

$$\frac{\alpha}{2\pi} = \frac{p}{\lambda}$$
$$\theta = \sin^{-1}\frac{\alpha\lambda}{2\pi d}$$

[Equation 2]

Here, α denotes a phase difference between UWB signals received by the first transceiver and the second transceiver provided in the UWB anchor.

In this manner, when the relative location of the UWB tag are determined according to the AoA positioning technology using the first antenna and the second antenna, the following considerations are needed.

Figure 5B:
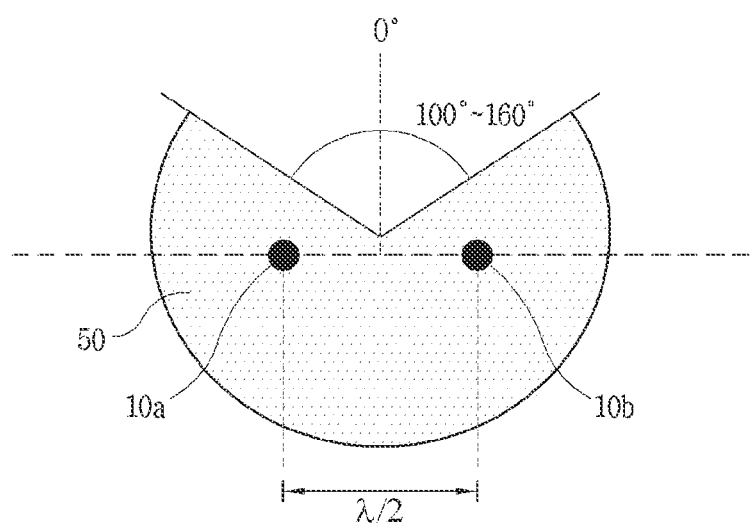

As one consideration, in FIG. 5B, the spaced distance between the first antenna 10a and the second antenna 10b is usually λ/2. That is, the plurality of antennas is arranged at an interval of λ/2. However, when a frequency to be used varies depending on environments, a point where the interval of λ/2 is satisfied is changed, and therefore, the distance between the plurality of antennas should also be changed.

As another consideration, there are two intersections between different circles which have effective radii with respect to the first antenna 10a and the second antenna 10b, respectively. This relates to whether the UWB tag is located either at the front or at the rear of the moving robot.

That is, it should be able to accurately determine a point (one intersection) where the UWB tag is actually located of two intersections which symmetrically exist with respect to an image plane (a dotted line in a horizontal direction).

As the last consideration, the range of an actual effective operating angle is limited due to the physical characteristics of the antennas. That is, when the first antenna 10a and the second antenna 10b are used, the effective operating angle is theoretically 180 degrees, but actually in the range of about 100 to 160 degrees. Therefore, combination/arrangement of antennas is needed for increasing the effective operating angle.

Accordingly, in the moving robot 100 according to the present disclosure, it has been realized that the interval between the plurality of antennas according to a frequency to be used is considered, whether the UWB tag is located at the front or at the rear of the moving robot is determined, and the effective operating angle is formed to be wider than an actual angle, in order to more accurately determine the relative location of the UWB tag in a limited environment.

Figure 7:
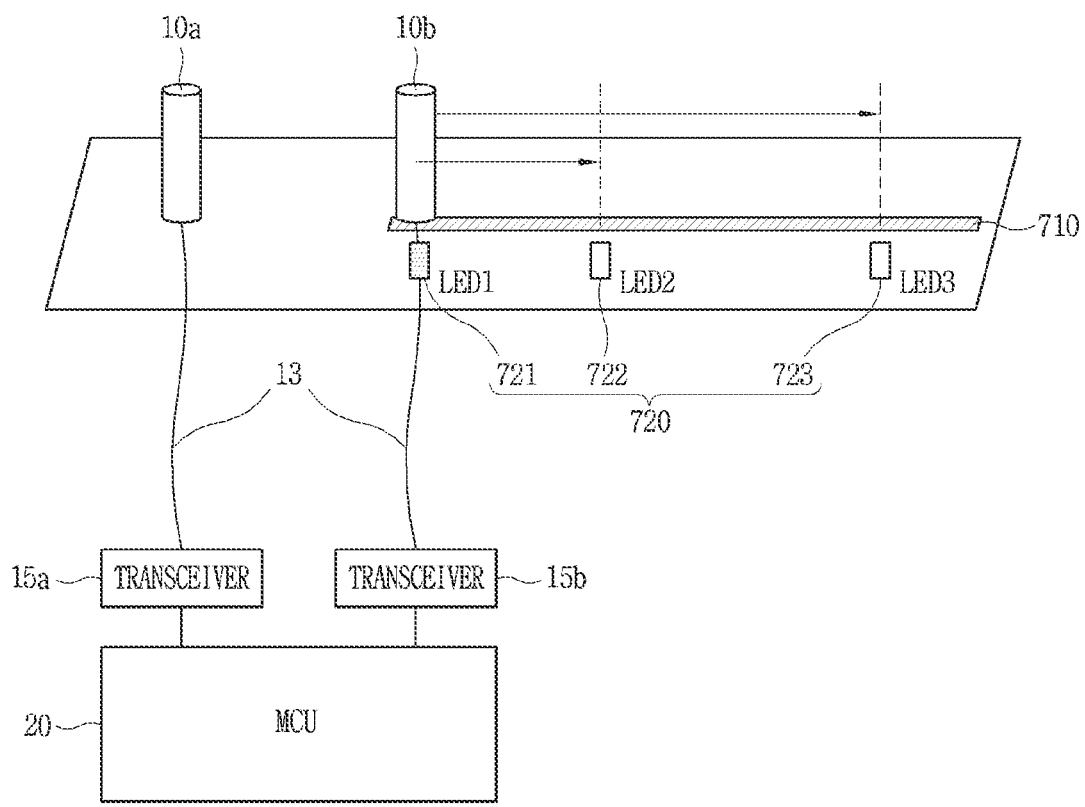
FIG. 7 is a conceptual view related to FIG. 6.

Hereinafter, FIG. 6 is a representative flowchart illustrating a method of controlling a moving robot according to an embodiment of the present disclosure, and FIG. 7 is a conceptual view related to FIG. 6.

Referring to FIG. 6, signals, for example, UWB signals are received from a UWB tag through a first antenna and a second antenna provided in a moving robot according to the present disclosure (S10).

Next, the control unit of the moving robot adjusts a spaced distance between the first antenna and the second antenna according to a frequency corresponding to the signal received from the UWB tag (S20). Specifically, since the point where the distance of λ/2 is satisfied is different according to a frequency to be used, the first antenna and the second antenna move relative to each other so as to satisfy the point where the distance of λ/2 is satisfied for each frequency, thereby adjusting the spaced distance d (see FIG. 5A).

In one embodiment, at least one of the first antenna and the second antenna may be provided with a sliding guide module, so that one of the first and second antennas can move relative to the other.

For example, referring to FIG. 7, the first antenna 10a is fixed and a sliding guide module 710 for moving the second antenna 10b in a predetermined direction may be disposed on a lower end of the second antenna 10b. In this case, the second antenna 10b may move along the sliding guide module 710 according to a control command of the control unit of the moving robot 100 or a control command of a Micro Controller Unit (MCU) 20.

In one example, stoppers may be provided on a plurality of points of the sliding guide module 710, respectively. Here, the stopper is formed to stop the second antenna 10b that is moving in a lengthwise direction of the sliding guide module 710. In addition, the stopper may have a locking element/function for fixing the second antenna 10b to a corresponding point.

When the distance between the first antenna 10a and the second antenna 10b corresponding to the frequency to be used is determined, the second antenna 10b is slid along the sliding guide module 710 according to the control command of the control unit of the moving robot 100 or the control command of the MCU 20. In addition, the control unit or the MCU 20 controls a stopper, which is located at a point selected from the plurality of points provided inside the sliding guide module 710, to be driven.

As described above, as at least one of the first antenna 10a and the second antenna 10b moves along the sliding guide module, the distance between the first antenna 10a and the second antenna 10b is changed.

As such, when the distance between the first antenna 10a and the second antenna 10b is changed, the frequency to be used is changed. Accordingly, when the frequency to be used is changed due to obstacles, interferences, or the like depending on circumstances, for example, when the second antenna is moved along the sliding guide module 710, as illustrated in FIG. 7, the distance between the first antenna 10a and the second antenna 10b is adjusted to correspond to the changed frequency to be used.

For example, when the distance I (see FIG. 5A) between the first antenna 10a or the second antenna 10b and the UWB tag T1 is increased beyond a reference range, the location of the second antenna 10b may be changed (e.g., the second antenna 10b is moved away from the first antenna 10a) to increase the distance between the first antenna 10a and the second antenna 10b.

In another example, when the distance I between the first antenna 10a or the second antenna 10b and the UWB tag T1 is decreased into the reference range, the location of the second antenna 10b may be changed (e.g., the second antenna 10b may be moved toward the first antenna 10a) to decrease the distance between the first antenna 10a and the second antenna 10b.

On the other hand, in one example, the distance between the first antenna 10a and the second antenna 10b is automatically determined according to a frequency to be used, which matches signals received from the UWB tag.

For this purpose, a distance value between the first antenna 10a and the second antenna 10b, which matches each frequency to be used, may be stored in advance in a memory of the moving robot 100 in the form of a table.

In another example, a location to which the second antenna 10b is to be moved, which corresponds to a distance between the first antenna 10a and the second antenna 10b determined according to a frequency to be used, may be guided and the second antenna 10b may be moved according to a user input.

Further, in one embodiment, on a plurality of points provided inside the sliding guide module 710 may be provided elements, for example, light emitting diodes 720 that indicate the plurality of points, respectively. The plurality of light emitting diodes 721, 722, and 723 indicate respective locations corresponding to the determined distances.

When an appropriate distance between the first antenna 10a and the second antenna 10b is changed as a frequency to be used is changed, a light emitting diode located at a point to which the second antenna 10b is to be moved may be turned on. Thereafter, the second antenna 10b may be moved to the corresponding point according to the control command of the control unit of the moving robot or the MCU 20 or through a user input. Also, the plurality of light emitting diodes 721, 722, and 723 may allow an external user to confirm the current location of the second antenna 10b.

On the other hand, the foregoing description has been given under the assumption that the sliding guide module 710 is provided only on the lower end of the first antenna 10a, but the sliding guide module 710 may alternatively be provided only on the lower end of the first antenna 10a or on both the first antenna 10a and the second antenna 10b.

If the distance between the first antenna and the second antenna is appropriately adjusted, a relative location of the UWB tag, for example, the location information transmitter that has transmitted the signals is determined by using a frequency corresponding to the distance between the first antenna and the second antenna (S30).

Specifically, after the distance between the first antenna and the second antenna is adjusted, a signal received through the first antenna 10a comes into a first transceiver 15a through a communication line 13. Also, a signal received through the second antenna 10b comes into a second transceiver 15b via the communication line 13. The signals coming through the plurality of transceivers 15a and 15b are processed through the MCU 20 to determine the relative location of the UWB tag.

As described above, according to the present disclosure, a distance between a plurality of antennas can be determined differently according to a frequency to be used, and a location of an antenna can be changed to satisfy the determined distance, which may result in more accurately determining a relative location corresponding to a signal received from a UWB tag. In addition, even when a frequency to be used is changed due to obstacles, signal interference, etc., the location of an antenna can be adjusted so as to satisfy a distance between a plurality of antennas that matches the changed frequency.

Hereinafter, description will be given in detail of a method for determining an actual location of a UWB tag among a plurality of solutions and improving the limitation of an effective operating angle, in determining the relative location of the UWB tag with respect to the location of the moving robot 100.

When the location of the UWB tag is determined using two antennas 10a and 10b provided in the moving robot 100, two solutions are obtained. This is because the UWB tag may be located at the front or rear of the moving robot 100.

In order to determine the actual location of the UWB tag of the two solutions, there may be a method of determining the front/rear side based on whether or not intensity of a received signal has been weakened as the signal passed through the moving robot 100. However, in this case, an exceptional situation in which the signal is weakened due to obstacles, interference, or the like is eliminated and an additional element (e.g., an ultrasonic light emitting diode, or an additional UWB sensor) is required to determine the intensity of the signal.

Accordingly, the present disclosure proposes a method of determining the actual location of the UWB tag of two solutions using only a plurality of antennas.

Specifically, the control unit of the moving robot according to the present disclosure may determine two intersections between a first area having an effective radius with respect to the first antenna and a second area having an effective radius with respect to the second antenna, based on a plurality of antenna combinations according to adjustment of a distance between the first antenna and the second antenna.

The control unit may determine an intersection of an area including more similar values, of the determined two intersections, as a relative location of the location information transmitter, i.e., a relative location of the UWB tag.

Figure 8A:
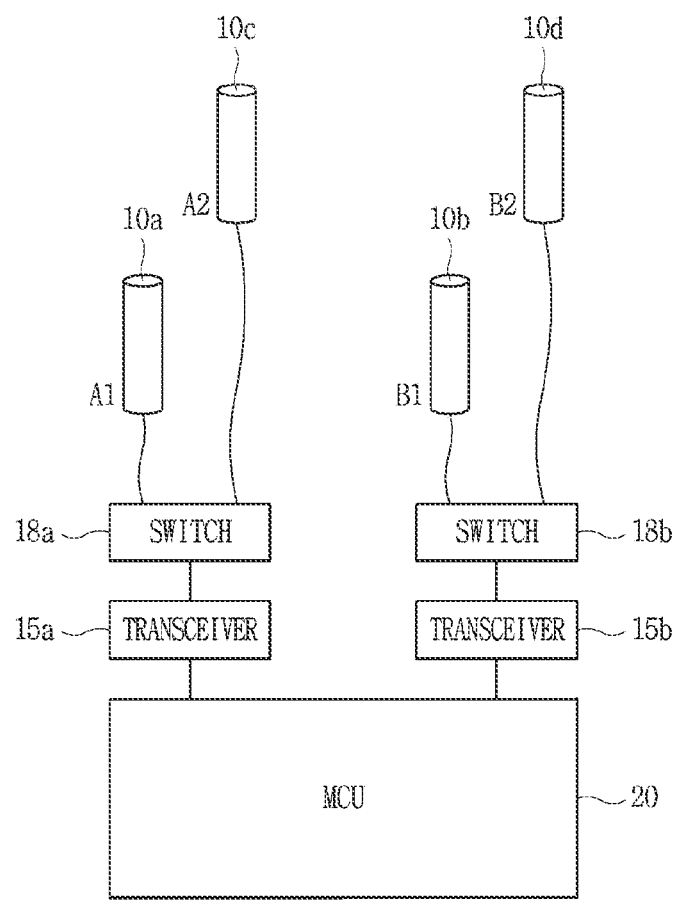
FIGS. 8A, 8B, 9A, 9B, 10A, and 10B are conceptual views illustrating different examples of accurately determining a relative location of a UWB tag according to various combinations of a plurality of antennas, in accordance with an embodiment of the present disclosure.
Figure 8B:
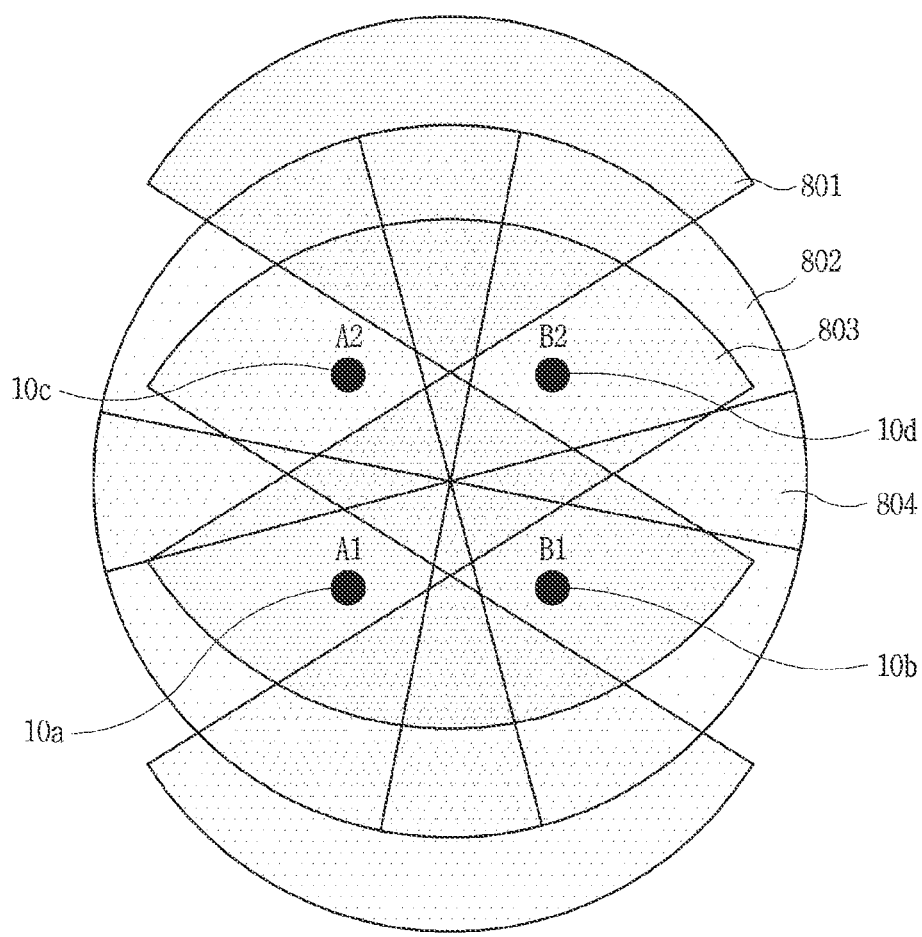

As one embodiment, FIGS. 8A and 8B illustrate a method of determining (recognizing) the relative location of the UWB tag based on four solutions obtained by combining four antennas and two switches.

The communication unit, for example, the UWB module of the moving robot may further include a third antenna 10c and a fourth antenna 10d which are electrically connected to the first transceiver 15a or the second transceiver 15b.

As illustrated in FIG. 8A, the first antenna 10a and the third antenna 10c may be electrically connected to the first transceiver 15a through a first switch 18a. Also, the second antenna 10b and the fourth antenna 10d may be electrically connected to the second transceiver 15b through a second switch 18b. The first transceiver 15a and the second transceiver 15b may be electrically connected to the MCU 20 so as to process signals received from the UWB tag. At this time, each antenna, each switch, each transceiver, and MCU 20 may be connected through cables or the like.

Although not shown, the first antenna 10a and the second antenna 10b may be electrically connected to the first transceiver through the first switch, and the third antenna 10c and the fourth antenna 10d may be electrically connected to the second transceiver through the second switch.

In this manner, when the arrangements of the plurality of antennas are combined, the control unit of the moving robot or the MCU 20 controls the operations of the first switch and the second switch to determine areas having effective radii for each of a plurality of antenna combinations.

FIG. 8A show four antenna combinations of (10a, 10b), (10a, 10d), (10c, 10b), and (10c, and 10d). Since each combination has two solutions, a total of eight solutions is obtained. Referring to FIG. 8B, each combination has symmetrical areas having effective radii with respect to the image plane. When the symmetrical areas are considered as one, a total of four effective areas 801, 802, 803, and 804 is obtained in the form of an image plane.

Since an intersection existing in an area with many similar values within effective areas 801, 802, 803, and 804 is more likely to be true solution, the actual location of the UWB tag may be determined as one of two solutions. That is, it can be known whether the UWB tag is located at the front or at the rear of the moving robot 100 based on the current location of the moving robot 100.

Figure 9A:
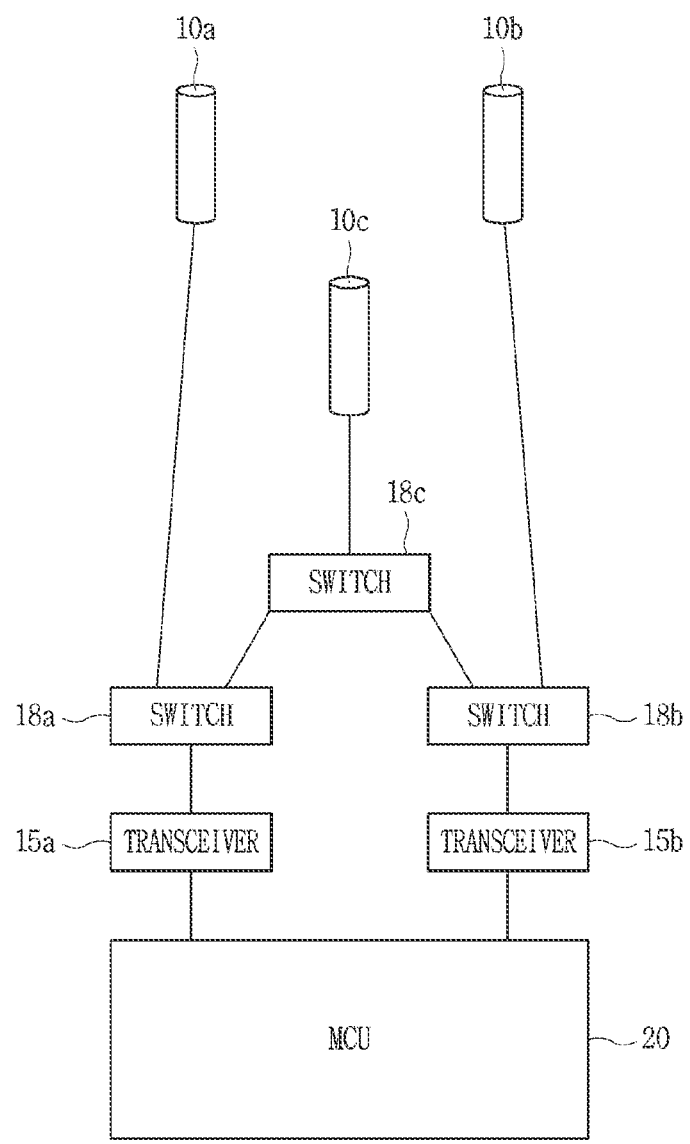
Figure 9B:
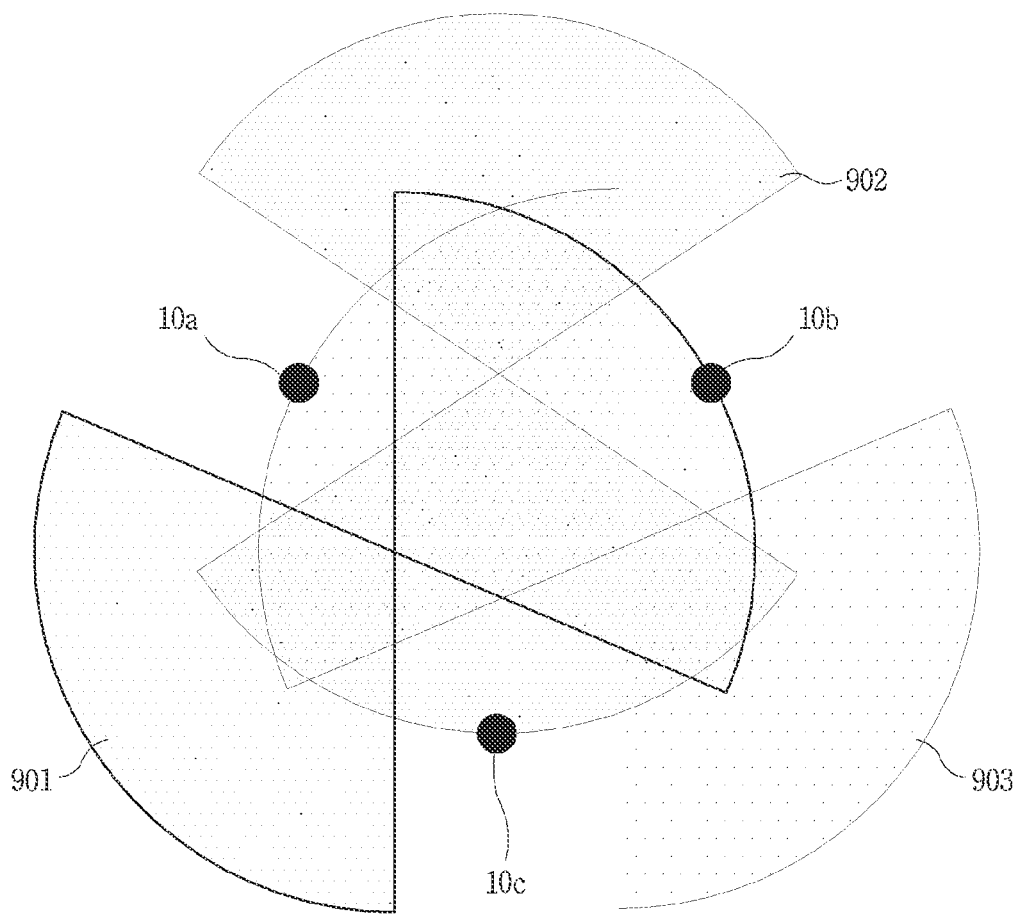

In another embodiment, FIGS. 9A and 9B illustrate a method of improving (increasing) an effective operating angle by a plurality of antennas in a manner of combining three antennas.

Referring to FIG. 9A, the communication unit, for example, the UWB module of the moving robot may further include a third antenna 10c which is electrically connected to the first transceiver 15a or the second transceiver 15b.

As illustrated in FIG. 9A, the first antenna 10a is electrically connected to the first transceiver 15a through the first switch 18a. Also, the second antenna 10b is electrically connected to the second transceiver 15b through the second switch 18b. The third antenna 10c is connected to the first switch 18a and the second switch 18b through a third switch 18c so as to be connected to both the first transceiver 15a and the second transceiver 15b.

In this case, the control unit of the moving robot or the MCU 20 may control the operations, for example, switching operations of the first switch 18a, the second switch 18b, and the third switch 18c, so as to increase the effective range of the areas having the effective radii.

At this time, the moving robot having those antennas may horizontally rotate to select the actual location of the UWB tag. When the moving robot rotates horizontally, two solutions (or two intersections) rotate in opposite directions to each other, and a desired solution of the two solutions is preset. Accordingly, as illustrated in FIG. 9B, it can be seen that the effective range of areas 901, 902, and 903 is increased only by the combination of the three antennas 10a, 10b, and 10c.

This may result in providing an effect that the limitation of the effective operating angle by the first antenna 10a and the second antenna 10b are improved/increased.

Figure 10A:
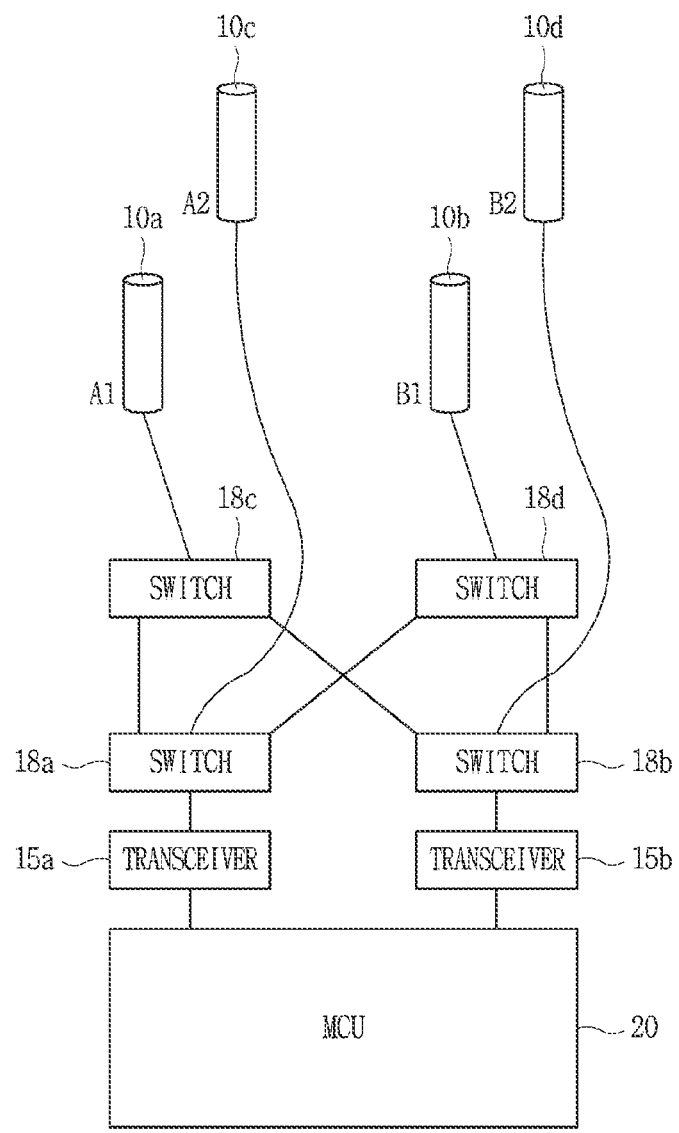
Figure 10B:
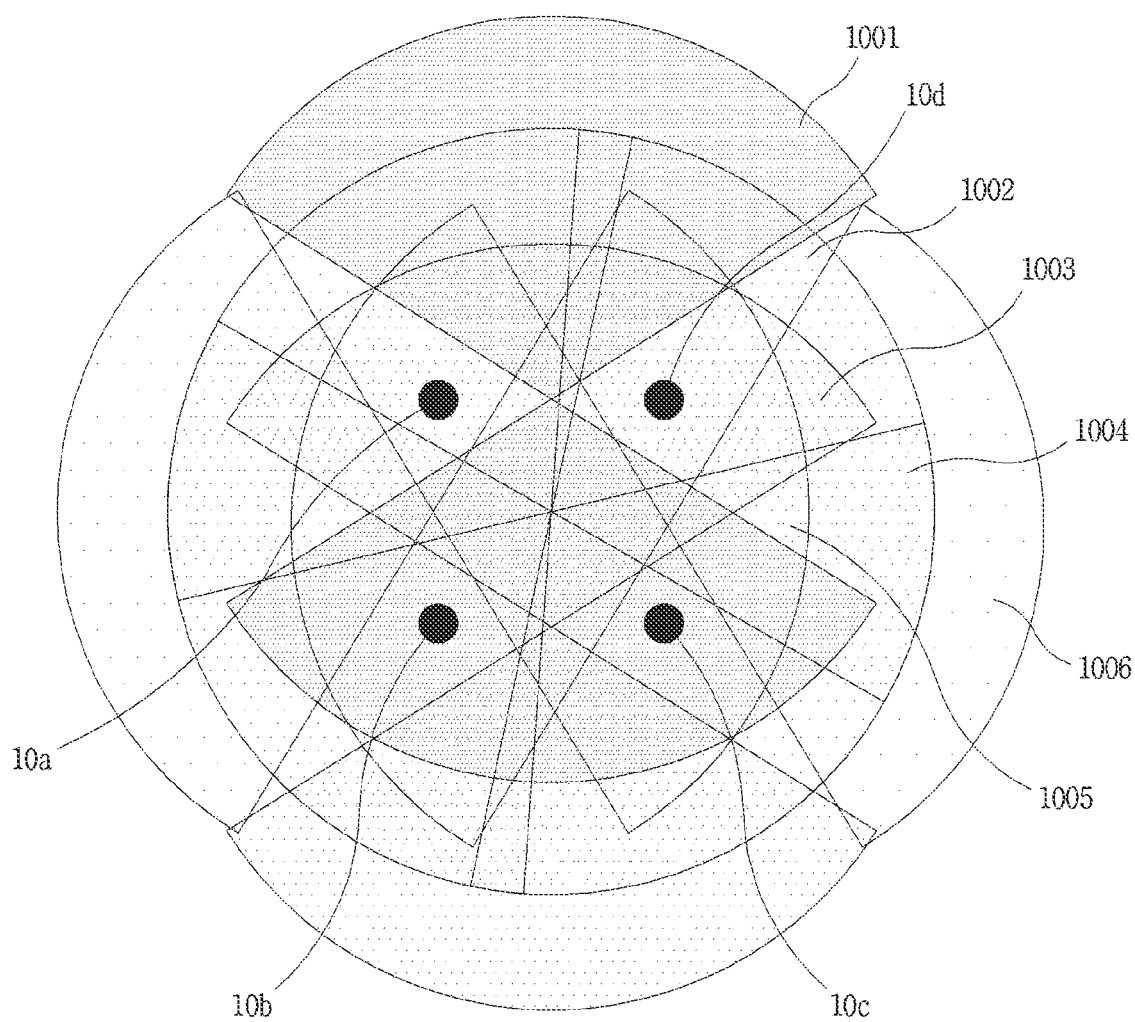

In another embodiment, FIGS. 10A and 10B illustrate a method of determining the relative location of the UWB tag based on six solutions obtained by combining four antennas and four switches.

The communication unit, for example, the UWB module of the moving robot may further include a third antenna 10c and a fourth antenna 10d which are electrically connected to the first transceiver 15a or the second transceiver 15b.

Referring to FIG. 10A, the third antenna 10c is electrically connected to the first transceiver 15a through the first switch 18a and the fourth antenna 10d is electrically connected to the second transceiver 15b through the second switch 18b.

The first antenna 10a is electrically connected to the first switch 18a and the second switch 18b through the third switch 18c so as to be connected to both the first transceiver 15a and the second transceiver 15b. Similar to this, the second antenna 10b is electrically connected to the first switch 18a and the second switch 18b through the third switch 18d so as to be connected to both the first transceiver 15a and the second transceiver 15b.

In this manner, when the arrangements of the plurality of antennas are combined, the control unit of the moving robot or the MCU 20 controls the operations of at least some of the first to fourth switches to determine areas having effective radii for each of the plurality of antenna combinations.

FIG. 10A shows six antenna combinations of (10a, 10b), (10a, 10d), (10c, 10b), (10c, 10d), (10a, 10c), and (10b, 10d). Since each combination has two solutions, a total of twelve solutions is obtained.

For example, referring to FIG. 10B, each combination has symmetrical areas having effective radii with respect to the image plane. When the symmetrical areas are considered as one, a total of six effective areas 1001, 1002, 1003, 1004, 1005, and 1006 is obtained in the form of an image plane, by four combinations of those antennas 10a, 10b, 10c, and 10d.

Since an intersection existing in an area with many similar values within the effective areas 1001, 1002, 1002, 1003, 1004, and 1006 is more likely to be true solution, the actual location of the UWB tag may be determined as one of two solutions. That is, it can be known whether the UWB tag is located at the front or at the rear of the moving robot 100 based on the current location of the moving robot 100.

As described above, in the present disclosure, it is possible to determine whether the UWB tag that has transmitted signals is located at the front or at the rear of the moving robot, simply by appropriately combining a plurality of antennas, and to obtain the same effect as the increase in an effective operating angle.

Meanwhile, the third and fourth antennas may be implemented to be normally inactivated whereas activated when necessary. To this end, an external module for activating the third antenna and/or the fourth antenna may be mounted on the moving robot, for example.

Figure 12A:
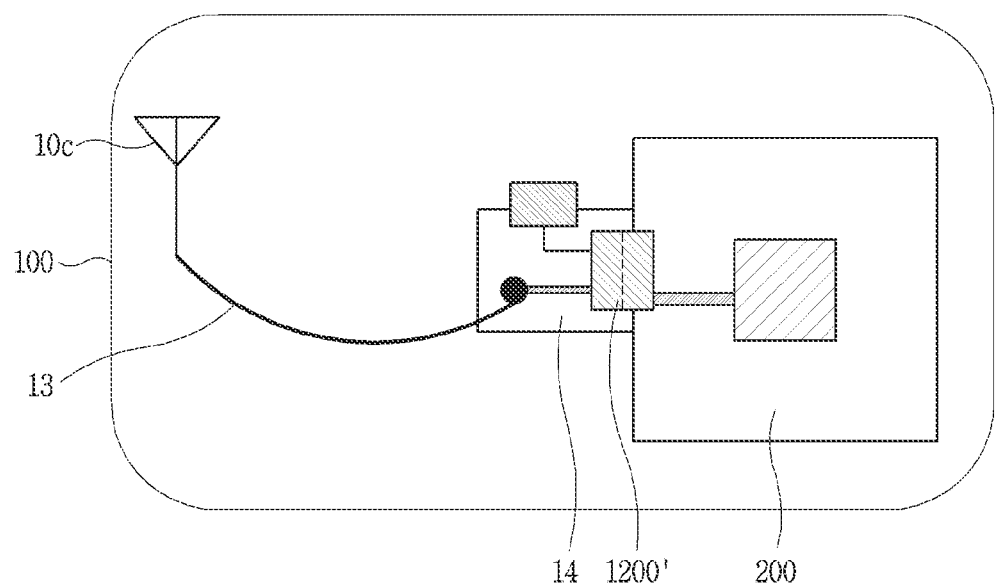
FIGS. 12A and 12B are conceptual views illustrating the flowchart of FIG. 11.
Figure 12B:
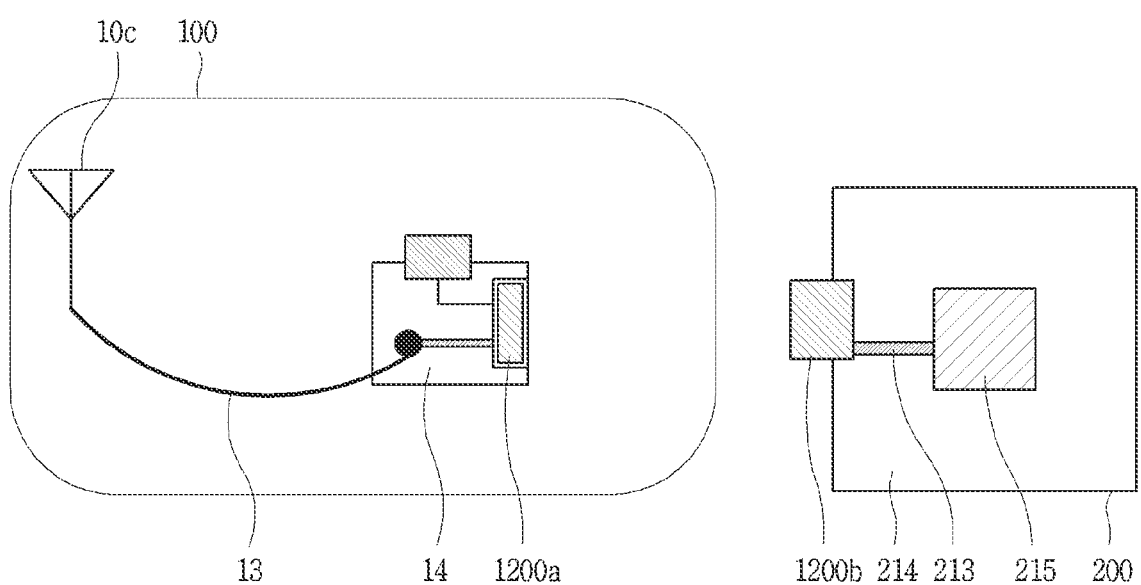

In relation to this, FIG. 11 is another flowchart illustrating a method of controlling a moving robot in accordance with an embodiment of the present disclosure, and FIGS. 12A and 12B are conceptual views illustrating the flowchart of FIG. 11.

Referring to FIG. 11, the moving robot starts to receive signals through a first antenna and a second antenna from a location information transmitter that transmits the signals in an area (S1101). The description thereof has been given in detail with reference to FIG. 6, and thus will be omitted. That is, a distance between the first antenna and the second antenna may be adjusted according to a frequency to be used.

Next, a first operation mode may be executed by detecting that an external module is connected to a third antenna provided in the main body of the moving robot (or moving robot main body) (S1102). Here, the external module refers to an accessory module that activates the operation of the third antenna disposed in the moving robot main body. The structure of the external module and the connection with the third antenna will be described in detail later with reference to FIGS. 12A and 12B.

In response to the execution of the first operation mode, the moving robot receives the signal transmitted from the location information transmitter using the first antenna, the second antenna, and the third antenna, and determines the relative location of the location information transmitter, namely, the relative location of the UWB tag, corresponding to the received signal (S1103).

As described above, by further using the third antenna, the effective operating angle can be improved and the actual location of the UWB tag can be determined among a plurality of solutions, as described above with reference to FIGS. 8A, 9A, and 10A.

On the other hand, when the external module connected to the third antenna is disconnected, the execution of the first operation mode is terminated (S1104). Thereafter, the flow returns to step S1101 to determine the location of the UWB tag using only the first antenna and the second antenna. Even in this instance, however, the spaced distance between the first antenna and the second antenna may be adjustable as the frequency to be used is changed, as described above.

In detail, FIG. 12A illustrates a state in which the external module is connected to the third antenna included in the moving robot 100, and FIG. 12B illustrates a state in which the external module connected to the third antenna is disconnected.

Referring to FIG. 12A, the moving robot 100 includes at least a third antenna 10c and the third antenna 10c is connected to an internal module 14 that supplies power to the third antenna 10c through a cable (e.g., RF cable) and enables data communication. And, FIG. 12A illustrates a state in which the internal module 14 is electrically connected to an external module 200 having a UWB chip or the like therein through a connector 1200'. In this case, the control unit of the moving robot or the MCU 20 detects that the internal module 14 and the external module 200 are connected to each other and controls the third antenna 10c to be activated.

The external module 200 may be detached from the connector exposed to one side of the internal module 14. That is, the external module 200 having the UWB chip or the like can be implemented as a separate accessory module. To this end, a connector element 1200a connected to the third antenna 10c through a cable 13 may be provided at one side of the main body of the moving robot 100. The external module 200 in which at least one communication chip (e.g., UWB chip) is disposed may be detachably coupled to the connector element 1200a.

Specifically, referring to FIG. 12B, the external module 200 may include a second connector 1200b connected to the first connector 1200a of the internal module 14 of the moving robot, a frame 214, a communication chip 215, and a communication line 213 for connecting the second connector 1200b and the communication chip 215 to each other.

At this time, the communication line 213 may have a resistance value of about 50 ohms (Ω) like a communication line of the internal module 14. The first connector 1200a and the second connector 1200b may be USB Type C connectors.

As such, by employing a structure in which an antenna is previously installed in a moving robot and a communication chip is connected through an external module, an additional antenna can be activated in a simple manner like inserting a UWB memory. Also, the additional antenna can be installed in the moving robot, thereby reducing the size of the external module. In addition to the moving robot, the external module can be used by being inserted not only into the moving robot but also into another electronic device having an antenna therein, in the form of a dongle, thereby obtaining enhanced utilization.

The control unit of the moving robot or the MCU can switch the third antenna from an active state to an inactive state when it is detected that the mounted external module is released.

Meanwhile, although the plurality of antennas is described as receiving UWB signals, the present disclosure is not limited to this, and may alternatively be configured to transmit and receive various types of signals. For example, the plurality of antennas may be configured to transmit and receive at least one of an Ultra-Wideband (UWB) signal, a signal output by one of wireless communication technologies (e.g., one of Zigbee, Z-wave, Blue-tooth, and UWB), an infrared signal, a laser signal, and an ultrasonic signal.

As described above, in a moving robot and a method of controlling the same according to embodiments of the present disclosure, a distance between a plurality of antennas can be determined differently according to a frequency to be used, and a location of an antenna can be changed to satisfy the determined distance, which may result in determining a relative location corresponding to a signal received from a UWB tag. Also, in the present disclosure, it is possible to determine whether the UWB tag that has transmitted signals is located at the front or at the rear of the moving robot, simply by using combinations of a plurality of antennas, and to obtain the same effect as the increase in an effective operating angle.

The present disclosure described above can be implemented as computer-readable codes on a program-recorded medium. The computer-readable medium may include all types of recording devices each storing data readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800 of the moving robot. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A moving robot, comprising:
    a traveling unit to move a main body thereof;
    a communication unit to perform communication with a location information transmitter for transmitting signals within an area; and
    a control unit to set a virtual boundary with respect to a location calculated based the signals of the location information transmitter, and to control the traveling unit so that the main body is moving without departing from the set boundary,
    wherein the communication unit comprises a first antenna and a second antenna provided in respective transceivers that transmit and receive signals to and from the location information transmitter, and the first antenna and the second antenna have an adjustable distance therebetween,
    wherein the control unit is further configured to:
        adjust the distance between the first antenna and the second antenna, and
        when signals are received through the first antenna and the second antenna, determine a relative location of the location information transmitter with respect to a current location of the main body using a frequency corresponding to the distance between the first antenna and the second antenna.

2. The moving robot of claim 1, wherein at least one of the first antenna and the second antenna comprises a sliding guide module, and the at least one antenna moves along the sliding guide module according to a control command of the control unit.

3. The moving robot of claim 2, wherein the sliding guide module comprises stoppers provided on a plurality of points thereof, respectively, and each of the stoppers is configured to stop an antenna moving in a lengthwise direction of the sliding guide module, and
    wherein the control unit controls the sliding guide module such that the stopper located at a point selected according to the control command is driven.

4. The moving robot of claim 1, wherein the distance between the first antenna and the second antenna is automatically determined according to a frequency to be used that matches the received signals.

5. The moving robot of claim 4, wherein the main body comprises a plurality of light emitting diodes provided on one side thereof each indicating a location corresponding to the determined distance, and wherein the control unit controls one light emitting diode, which is disposed at a location corresponding to the determined distance, among the plurality of light emitting diodes, to emit light, and controls one of the first antenna and the second antenna to be positioned at a location corresponding to the light-emitted light emitting diode.

6. The moving robot of claim 1, wherein the control unit determines two intersections between a first area having an effective radius with respect to the first antenna and a second area having an effective radius with respect to the second antenna, based on a plurality of antenna combinations according to adjustment of the distance between the first antenna and the second antenna, and determines an intersection of an area including more similar values, of the determined two intersection points, as the relative location of the location information transmitter.

7. The moving robot of claim 1, wherein the communication unit further comprises at least a third antenna, and wherein the main body comprises a connector element provided on one side thereof and connected to the third antenna through a cable, and a module having at least one communication chip therein is mounted to the connector element.

8. The moving robot of claim 7, wherein the control unit controls the third antenna to be activated, in response to detection that the module is mounted.

9. The moving robot of claim 8, wherein the control unit switches the third antenna from an active state into an inactive state, in response to detection that the mounted module is released.

10. A method for controlling a moving robot, the method comprising:

receiving signals through a first antenna and a second antenna from a location information transmitter that transmits the signals in an area;
adjusting a distance between the first antenna and the second antenna according to a frequency corresponding to the received signals; and
determining a relative location of the location information transmitter, which has transmitted the signals, using a frequency corresponding to the distance between the first antenna and the second antenna,
wherein the distance between the first antenna and the second antenna is automatically determined according to a frequency to be used that matches the received signals.

11. The method of claim 10, further comprising:
detecting connection of an external module to a third antenna provided in a moving robot main body; and
executing a first operation mode in response to the detection, receiving signals using the first antenna, the second antenna, and the third antenna, and determining a relative location corresponding to the received signals.

12. The method of claim 11, further comprising:
terminating the execution of the first operation mode when the connection of the external module is released, and receiving signals through the first antenna and the second antenna.

* * * * *